(12) United States Patent
Murray et al.

(10) Patent No.: US 8,176,095 B2
(45) Date of Patent: May 8, 2012

(54) COLLECTING, SHARING, COMPARING, AND DISPLAYING RESOURCE USAGE DATA

(75) Inventors: Michael Edward Murray, Oakland, CA (US); John Edmund Petersen, Oberlin, OH (US); Gavin Matthew Platt, Oakland, CA (US); Vladislav Kantchev Shunturov, Sofia (BG)

(73) Assignee: Lucid Design Group, LLC, Oakland, CA (US)

( * ) Notice: Subject to any disclaimer, the term of this patent is extended or adjusted under 35 U.S.C. 154(b) by 252 days.

(21) Appl. No.: 11/867,565

(22) Filed: Oct. 4, 2007

(65) Prior Publication Data

US 2008/0306985 A1 Dec. 11, 2008

Related U.S. Application Data

(60) Provisional application No. 60/943,075, filed on Jun. 11, 2007.

(51) Int. Cl.
*G06F 7/00* (2006.01)
(52) U.S. Cl. .................................. 707/805; 715/14.2
(58) Field of Classification Search .................. 707/1, 6, 707/10, 101, 102, 200, 805, 944, 758, 770, 707/999.107, 705, 723, 766, 999.102; 715/200, 715/202, 236, 700, 205, 206, 243, 273, 739, 715/797, 810; 705/1, 7, 10, 11, 1.1, 7.11, 705/7.15, 7.22, 7.29, 7.32, 7.35, 14.12, 14.42; 714/E11.192; 709/224, 226, 204
See application file for complete search history.

(56) References Cited

U.S. PATENT DOCUMENTS

| | | | |
|---|---|---|---|
| 6,002,398 A * | 12/1999 | Wilson | 715/777 |
| 6,341,270 B1 | 1/2002 | Esposito et al. | |
| 7,076,434 B1 | 7/2006 | Newnam et al. | |
| 7,076,504 B1 | 7/2006 | Handel et al. | |
| 7,823,068 B2 * | 10/2010 | Cowtan et al. | 715/738 |
| 2002/0178047 A1* | 11/2002 | Or et al. | 705/10 |
| 2003/0126151 A1* | 7/2003 | Jung | 707/100 |
| 2003/0177176 A1* | 9/2003 | Hirschfeld et al. | 709/203 |
| 2003/0182250 A1 | 9/2003 | Shihidehpour et al. | |
| 2003/0191683 A1 | 10/2003 | Bailey | |
| 2005/0096975 A1 | 5/2005 | Moshe | |
| 2005/0132041 A1* | 6/2005 | Kundu | 709/224 |
| 2005/0182750 A1* | 8/2005 | Krishna et al. | 707/1 |
| 2005/0246229 A1* | 11/2005 | Goldstein | 705/14 |
| 2005/0251440 A1 | 11/2005 | Bednarek | |
| 2006/0190319 A1* | 8/2006 | Hanswadkar | 705/10 |
| 2007/0162292 A1 | 7/2007 | Bell et al. | |

OTHER PUBLICATIONS

Da Cruz, Monitoring E-Business Web Services Usage through a Log Based Architecture, Web Services 2004, Proceedings IEEE International Conferences on, Jul. 6-9, 2004, pp. 1-10.*

(Continued)

*Primary Examiner* — Greta Robinson
(74) *Attorney, Agent, or Firm* — Raubvogel Law Office

(57) ABSTRACT

Resource usage data is automatically collected for an individual, household, family, organization, or other entity. The collected data is transmitted to a central repository, where it is stored and compared with real-time and/or historical usage data by that same entity and/or with data from other sources. Graphical, interactive displays and reports of resource usage data are then made available. These displays can include comparisons with data representing any or all of community averages, specific entities, historical use, representative similarly-situated entities, and the like. Resource usage data can be made available within a social networking context, published, and/or selectively shared with other entities.

21 Claims, 18 Drawing Sheets

OTHER PUBLICATIONS

Clive Thompson, "Clive Thompson Thinks: Desktop Orb Could Reform Energy Hogs", in Wired Magazine, Issue 15.08, Jul. 24, 2007.

"Wattson", printed from www.diykyoto.com/wattson.html (printed on Jan. 8, 2008).

"Wattson—How it Works", printed from www.diykyoto.com/howitworks.html (printed on Jan. 8, 2008).

"Wattson—Features and Benefits", printed from www.diykyoto.com/features.html (printed on Jan. 8, 2008).

"Wattson—Community", printed from www.diykyoto.com/community.html (printed on Jan. 8, 2008).

* cited by examiner

FIG. 2C

COLLECTING, SHARING, COMPARING, AND DISPLAYING RESOURCE USAGE DATA

CROSS-REFERENCE TO RELATED APPLICATIONS

The present application claims priority from U.S. Provisional Patent Application No. 60/943,075, filed on Jun. 11, 2007 and entitled "Method and Apparatus for Energy Monitoring and Management of Buildings and/or Facilities", the disclosure of which is incorporated herein by reference.

FIELD OF THE INVENTION

This invention relates generally to collecting, sharing, comparing, and displaying data related to resource usage, and further to interactive and comparative displays of such information in group environments such as social networks.

BACKGROUND OF THE INVENTION

Consumers of resources often have economic and/or environmental incentives to engage in conservation. Many such resources, such as electricity, natural gas, and water are scarce and/or expensive; in addition, their use can have negative environmental consequences. Increased awareness of the environmental and economic impacts of resource usage has caused individuals, organizations, and governments to engage in efforts to reduce consumption through a wide variety of resource-saving and renewable energy technologies. Examples include photovoltaic and solar thermal panels, energy-efficient heating systems, water- and power-conserving appliances and equipment, and the like. In addition to the incorporation of efficient or renewable energy technology, consumer behavior plays a critical role in resource use. Changes in behavior can substantially reduce resource use.

In the description provided herein, the terms "user", "customer", and "entity" are used interchangeably to refer to either an individual user or a group of users. A "user", "customer", or "entity" may therefore include any or all of an individual user, household, company, organization, or any definable groups (which may be defined according to any relevant criteria, such as for example social, economic, geographic, demographic, and/or other criteria).

Conservation efforts are more effective when entities receive tangible feedback showing them the results of their efforts. Traditionally, such feedback has been limited and nonspecific; often, the only feedback an entity receives is the monthly utility bill. Without more specific information, a homeowner, renter, business owner, or other defined group might experience changes in their utility bill from one month to the next without knowing which appliances, usage patterns, or choices are responsible for the changes. Some entities, such as those whose utilities are paid by others, receive no feedback on their resource usage at all. With limited or non-existent information the entity is unable to effectively isolate and identify appliances and/or equipment that are responsible for the greatest resource usage. Conservation efforts are greatly hampered by this lack of information.

It is also useful for entities to see how their resource consumption compares against that of others. Entities may be interested in comparing their resource usage against any of a variety of benchmarks, including their own historical usage and/or usage of other entities, including for example, average use by all similarly defined entities, average use by a similar demographic of consumers within a comparable geographic or climatic region, a cross-section of similar entities, a specific community of other entities, and the like. In some circumstances, it may be useful and desirable for entities to compete against each other to minimize resource use. Existing resource usage monitoring technologies typically lack a mechanism for an entity to compare its resource usage with that of other entities. Visual comparison of consumption by an entity with the resource use of other entities is useful both at an instant in time and as a comparative trend of resource use over time.

An entity may also wish to make its resource usage data public, or to share it with certain other entities, for example in a social network, website, newsgroup, or other forum. Publication of such data may be useful for social purposes, for marketing purposes, or to motivate members of one's own group and other groups to increase their conservation efforts. Existing resource usage monitoring techniques generally do not provide effective, intuitive, and convenient mechanisms for sharing data in this manner.

Entities may also wish to compare a current temporal pattern of consumption with a previously established temporal pattern of consumption over either a defined time period (e.g. this week with last week) or with a long-term pattern of consumption over similar time periods (e.g. hourly data for this week compared with median hourly consumption for all previous week's at this particular season). This may help identify the effect of certain events or changes on energy consumption. Existing resource usage technologies do not provide an easy way to compare temporal patterns in this way; it is therefore difficult for entities to establish a cause-and-effect relationship that can help improve understanding of the effectiveness of resource conservation efforts.

Existing resource usage monitoring products fail to provide these features. Kill A Watt is an electricity usage monitor, available from P3 International Corporation of New York, New York, providing functionality for measuring resource usage of individual plug loads or appliances. TED (The Energy Detective) is an electricity monitor, available from Energy, Inc. of Charleston, S.C. and described at www.theenergydetective.com, providing electricity usage information on an in-home digital readout. The PowerCost Monitor, available from Blue Line Innovations, Inc. of St. John's, Newfoundland and Labrador, Canada, provides electricity usage information on a similar hand-held readout. None of these products provides a comprehensive mechanism for collecting, displaying, sharing, and comparing resource usage data. Nor do these products offer a computer interface allowing an entity to mark an event (such as the install date of a device) and compare pre-event usage with post-event usage.

What is needed, therefore, is a system and method of collecting resource usage data with minimal user effort, and of presenting such data in a visually compelling format that allows comparison of current resource usage with prior resource usage during a similar period of time and to compare their resource use with the resource usage of others at a particular moment and/or over time. What is further needed is a system and method that enables visualization and/or sharing of resource usage data in an intuitive, user-controllable manner.

What is further needed is a mechanism for identifying actions or events that result in changes in or anomalous patterns of resource use so that an entity can better understand and respond to cause-and-effect relationships.

SUMMARY

The present invention is a system and method for collecting resource usage data for an individual, household, family, business, organization, or other socially or economically defined entity. The collected data is transmitted to a central repository, where it is stored, processed and then interactively displayed in comparison with data for the same entity during a different period in time or in comparison with other entities. These displays can include comparisons with data representing any or all of community averages, specific entities, historical use or current use of specific or similarly-situated entities or averages of these entities, and the like.

Entities are also able to publish and/or selectively share their resource usage data with specified other entities. Entities can also engage in competition with other entities so as to further encourage resource conservation and responsible usage patterns. Competitions serve as an important motivational mechanism for reducing resource consumption. Entities can share their data in a group environment such as a social network, including 1) specialized social networks designed for sharing resource usage data and/or 2) existing social networks such as Facebook or MySpace. In the context of such shared environments, entities can set mutual or shared goals; and can engage in competitions with other entities so as to provide further incentives for conservation. Sponsors may also be enlisted to provide monetary or product incentives for improvements during specific time periods.

The collection, display, and sharing of information according to the present invention can be implemented using electronic means, such as via a client/server architecture wherein various components communicate with one another using a known network protocol. One skilled in the art will recognize that other implementations are also possible.

Usage reports can be made available via any known delivery mechanism, whether electronic or otherwise. For example, reports can be made available via a display, website, printed report, email, kiosk, voice-based systems, text messages, and the like. Entities can specify what kind of information is collected, how often it is collected, and whether and how it is made available to others. Entities can also specify whether and how they wish to receive usage reports, and whether and how such reports are made available to specified other entities or with the public at large.

The present invention thus provides a system and method for collecting, processing, analyzing and translating resource usage data (including consumption, production, and environmental performance) in a manner that yields interactive and intuitive presentations of such data for a non-technical audience. The invention also provides a system and method for sharing the collected data and comparing it with reference data acquired from the same entity and from other individuals, entities, as well as with aggregated data representing a range of different communities in which the entity might wish to compare their behavior. The invention also provides mechanisms for publishing resource usage data within the context of a specialized social network and/or an existing social network such as Facebook, MySpace, or the like.

The present invention also facilitates comparison of a current temporal pattern of consumption with a previously established temporal pattern of consumption over either a defined time period (e.g. this week with last week) or with a long-term pattern of consumption over similar time periods (e.g. hourly data for this week compared with median hourly consumption for all previous week's at this particular season), so as to highlight the effect of certain events or changes on energy consumption. Events, such as installation of a new energy-saving device or a change in settings, can be tagged. These tagged events then appear in graphs and subsequent displays or reports so that the entity can determine whether the event had any effect on resource usage. In this manner, the present invention helps identify those changes that are most effective in managing consumption.

The present invention provides any or all of the following features, either individually or in any combination:

- generate real-time displays and/or cumulative reports comparing an entity's resource usage against the resource usage of other designated entities;
- generate real-time displays and/or cumulative reports comparing an entity's resource usage against a set of entities that may be defined by any desired parameters, and that may be anonymous if desired;
- generate real-time displays and/or cumulative reports comparing an entity's resource usage against specified budgets and/or reduction goals;
- generate real-time displays and/or cumulative reports comparing an entity's resource usage patterns during similar periods in the past (e.g. patterns of use today compared with this same entity's use yesterday, patterns of use this season or year with average use over all previous similar seasons or averaged over all previous years monitored, and the like);
- generate real-time displays and cumulative reports comparing resource use data for the purpose of competition against another entity, or privately determined or publicly (and mutually) specified budgets or reduction goals;
- isolate and tag specific events, such as installation of a new energy-saving device, so as to highlight the effect of such events within the context of a resource usage display or report;
- publish and/or share an entity's resource usage data with others either as data that are tagged as being associated with the entity, or as data that can only be used to compare in aggregate with other entities.

The present invention thus provides a system and method by which resource usage data can be shared and compared. The invention further allows entities to communicate, contrast, and compete with one another regarding resource usage in a social networking environment.

BRIEF DESCRIPTION OF THE DRAWINGS

FIG. 2C is a screen shot depicting an example of a summary screen showing a usage graph according to one embodiment.

One skilled in the art will readily recognize from the following discussion that alternative embodiments of the structures and methods illustrated herein may be employed without departing from the principles of the invention described herein.

DETAILED DESCRIPTION OF THE EMBODIMENTS

As mentioned above, the description uses the terms "user", "customer", and "entity" interchangeably to refer to either an individual user or a group of users. A "user", "customer", or "entity" may therefore include any or all of an individual user, household, company, organization, or any definable groups (which may be defined according to any relevant criteria, such as for example social, economic, geographic, demographic, and/or other criteria). Groups may include individuals who do not directly pay utility bills, such as for example renters whose utilities are included in rent payments, employees of companies, and the like.

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In addition, the drawings and descriptions present several examples of interactive displays, web pages, and user interfaces. These are provided for illustrative purposes only. One skilled in the art will recognize that many other layouts, arrangements, visual elements, features, widgets, and interactive components may be provided without departing from the essential characteristics of the present invention as set forth in the claims. One skilled in the art will further recognize that the particular elements and arrangements of elements depicted are merely illustrative and that any particular element may be moved, changed, or deleted without departing from the essential characteristics of the present invention as set forth in the claims.

Figure 9:
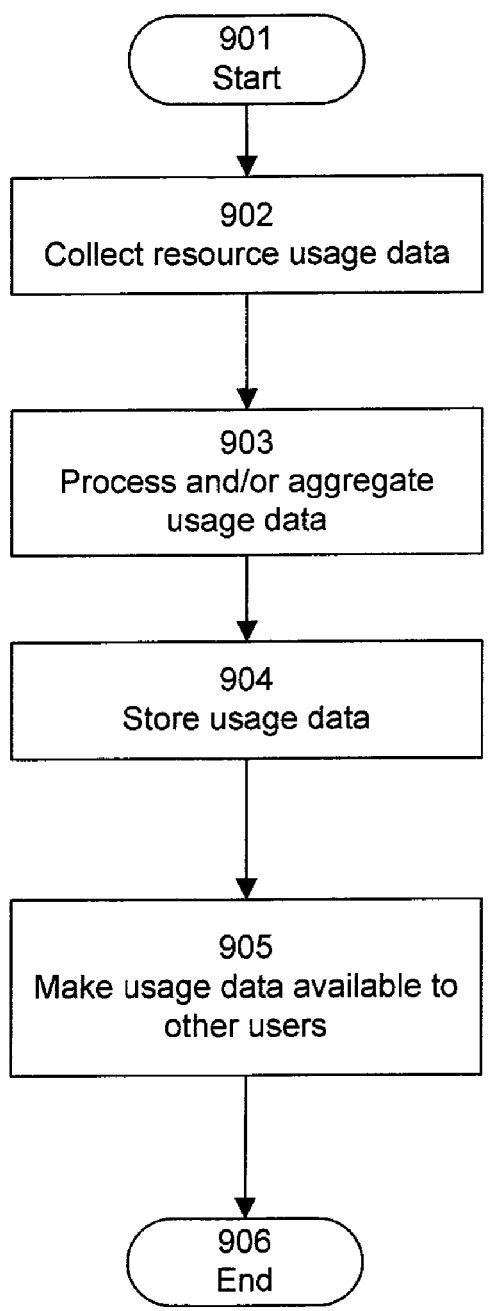
FIG. 9 is a flow diagram depicting a method for collecting, processing, and sharing resource usage data according to one embodiment.

Referring now to FIG. 9, there is shown a flow diagram depicting a method for collecting, processing, and sharing resource usage data according to one embodiment. According to the present invention, resource usage data is collected 902 from a number of sources, as described in more detail below. Each data source can be associated with an entity, such as an individual user, household, company, organization, neighborhood, building, locale, or the like. The usage data may represent, for example, total aggregate electricity consumption, consumption by disaggregated components (e.g. by certain appliances) solar power generation, water consumption, natural gas consumption, and the like. In one embodiment, data is collected at a number of disparate locations. The collected data is transmitted to a central repository, where it is processed, and/or aggregated 903 according to techniques described in more detail below. For example, averages, trends, comparative data, and the like can be calculated. Derived data points, including any data that is determined by performing calculations on the acquired data, can also be established.

The resource usage data is then stored 904, either in its original form or in processed/aggregated form, or both. In one embodiment, as described below, the data is stored 904 in a central location so that it can be made available 905 to other entities in a client/server mode of interaction. Various mechanisms can be implemented for making data available to other entities, as described in more detail below. For example, stored data can be published as part of a social network page which may be part of a specialized social network for sharing resource usage data, or a general social network such as Facebook or MySpace. In one embodiment, only a subset and/or an aggregation of the usage data is made available. In another embodiment, the data is shared in such a way that only authorized entities are able to access it. The data may be shared in a manner that permits other entities to comment on or augment the information in an interactive online environment.

Figure 10:
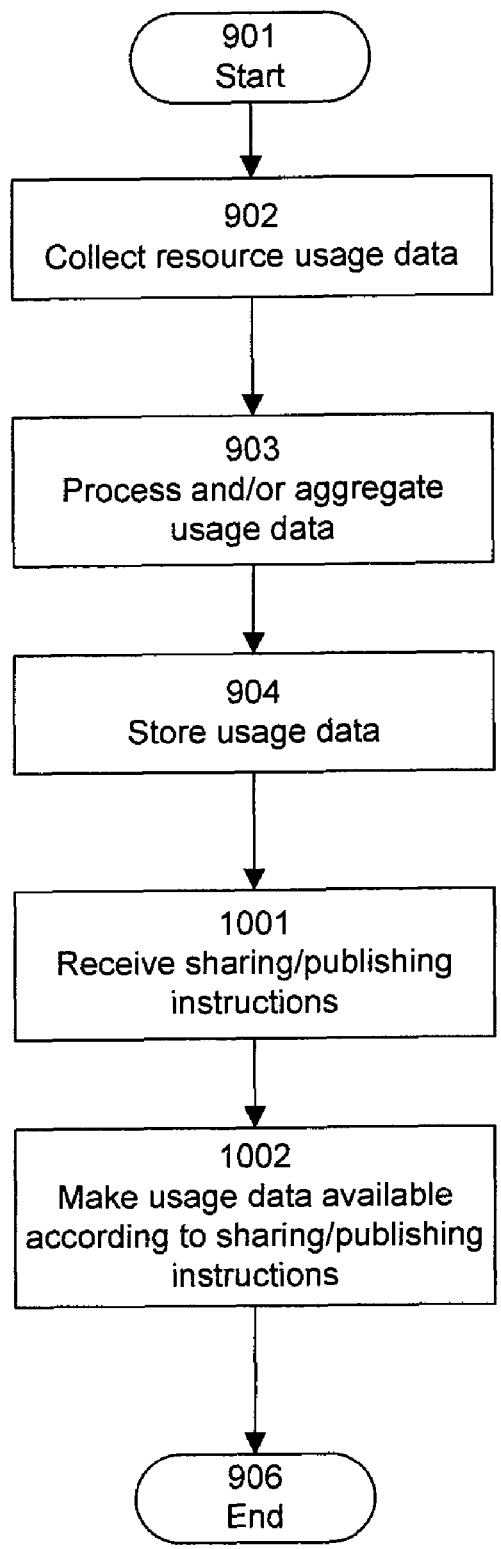
FIG. 10 is a flow diagram depicting an alternative method for collecting, processing, and sharing resource usage data according to one embodiment.

Referring now to FIG. 10, there is shown a flow diagram depicting an alternative method for collecting, processing, and sharing resource usage data according to one embodiment. FIG. 10 is similar to FIG. 9, but includes a step 1001 wherein sharing/publishing instructions are received. Thus, in this embodiment, usage data is made available 1002 to other entities according to specific instructions provided, for example, by the entity associated with the collected data, or by an administrator, or by some other entity. FIG. 10 thus represents a method where data sharing takes place in response to affirmatively stated instructions of entities.

Once data have been collected and stored in a common location, resource usage data for one entity can be compared with stored resource usage data for other entities, and a comparative display can be generated. The comparative display thus provides the entity with a useful benchmark for understanding and interpreting resource usage trends.

Figure 1A:
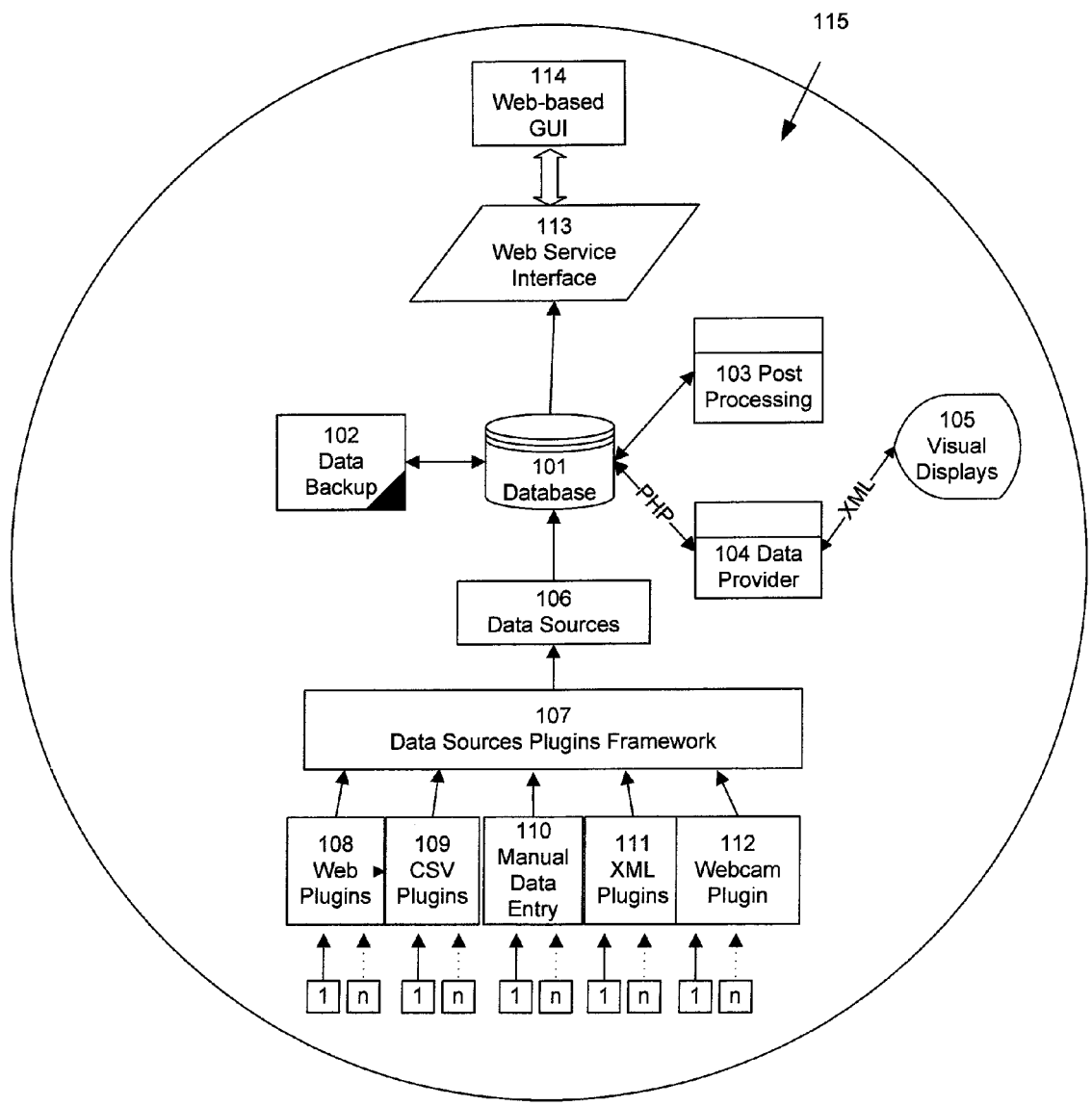
FIG. 1A is a block diagram depicting a server-side architecture for practicing the present invention according to one embodiment.

Referring also to FIG. 1A, there is shown a block diagram depicting a server-side architecture for practicing the present invention according to one embodiment. In one embodiment, the components of FIG. 1A are implemented as a hosted service 115 running, for example, on a server. The various components can be implemented as part of such a server or as separate elements that are communicatively coupled with one another.

Database 101 includes records describing resource usage for various entities such as individuals, households, organizations, companies, and the like. A mechanism can be included for periodically copying database 101 or portions thereof to a data backup storage area 102.

Resource usage data for database 101 is collected from various data sources 106, which in turn collect usage data by monitoring meters, receiving user input, receiving data records from other sources, and the like. In one embodiment, a data sources plug-in framework 107 is provided to act as an interface for providing data in a format that can be normalized and stored in database 101. Framework 107 enables the receiving and/or collecting of data from various sources including, for example and without limitation:
  web plug-ins 108 for collecting data via HTTP or other web-enabled services;
  CSV plug-ins 109 for collecting data from comma-separated-value format or other delimited format;
  manual data entry 110 for receiving data entered manually;
  XML plug-ins 111 for collecting data in XML format;
  webcam plug-ins 112 for collecting and interpreting data from a webcam-type source; and
  plug-in for receiving data pushed by a data source over TCP or UDP network protocol(s), either in binary or plain text encoding (the plain text encoded data can be formatted either as key-value pairs, XML, or CSV format).

Any or all of the sources can include any number of instances.

Figure 1B:
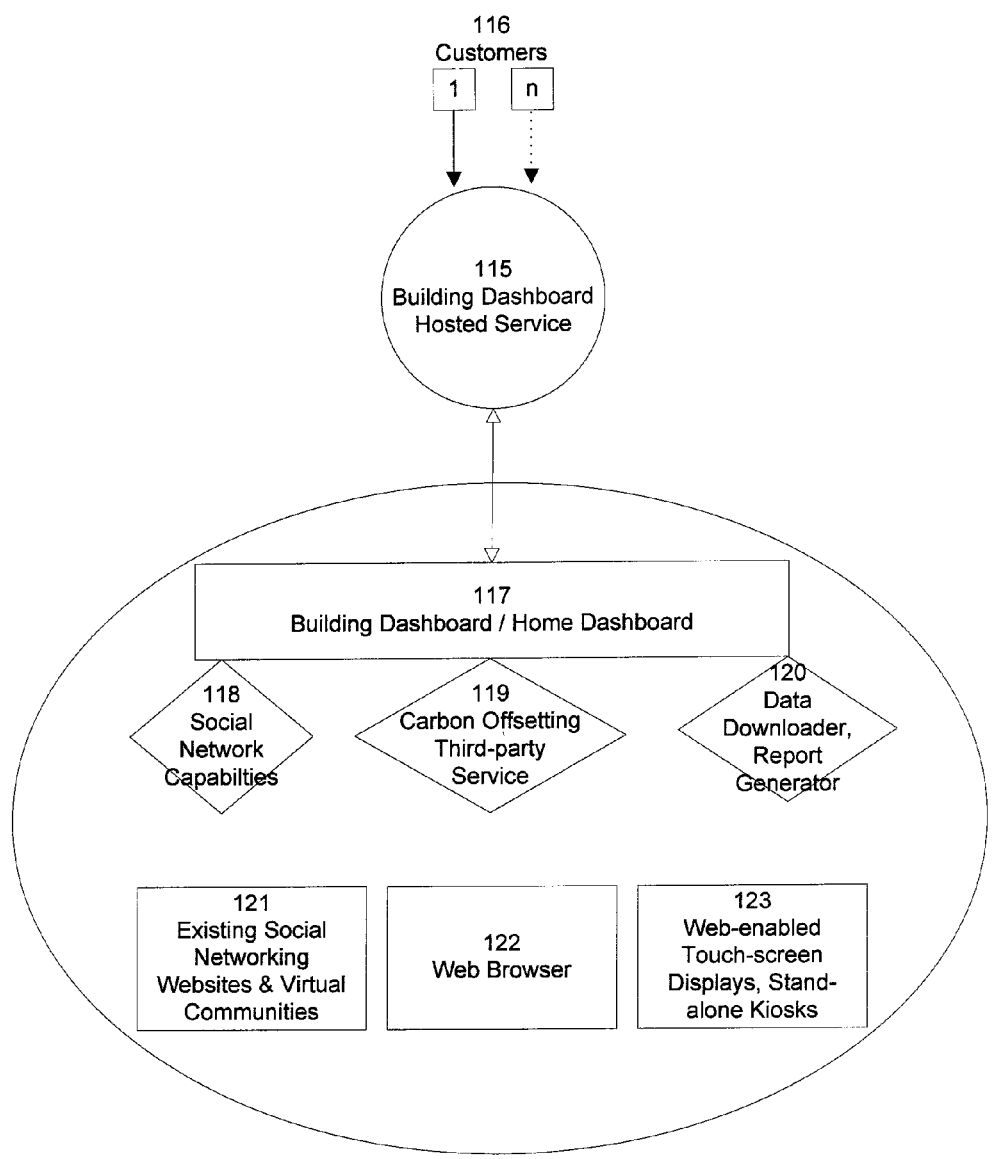
FIG. 1B is a block diagram depicting a client-side architecture for practicing the present invention according to one embodiment.
Figure 1C:
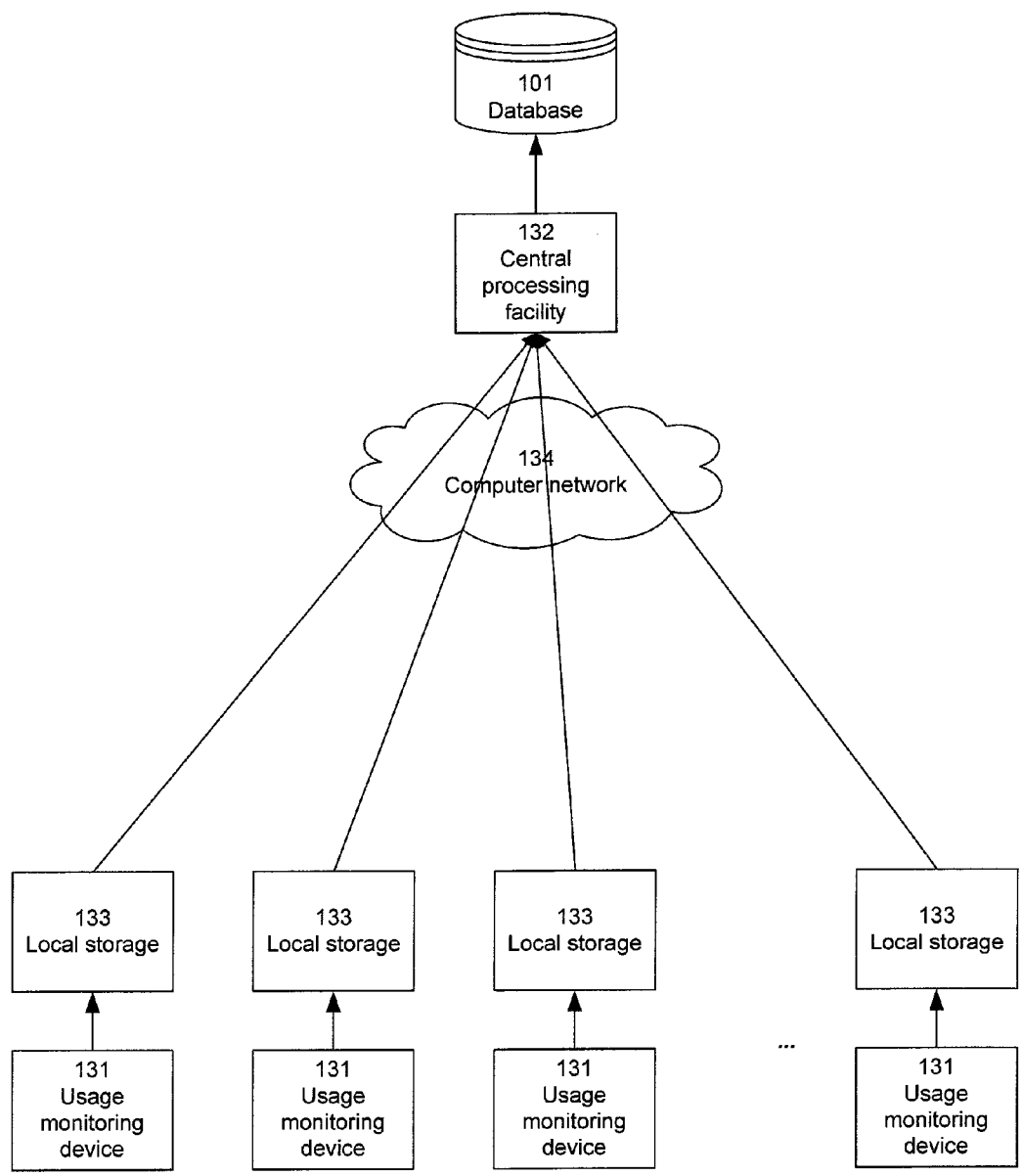
FIG. 1C is a block diagram depicting an architecture for collecting usage data according to one embodiment.
Figure 1D:
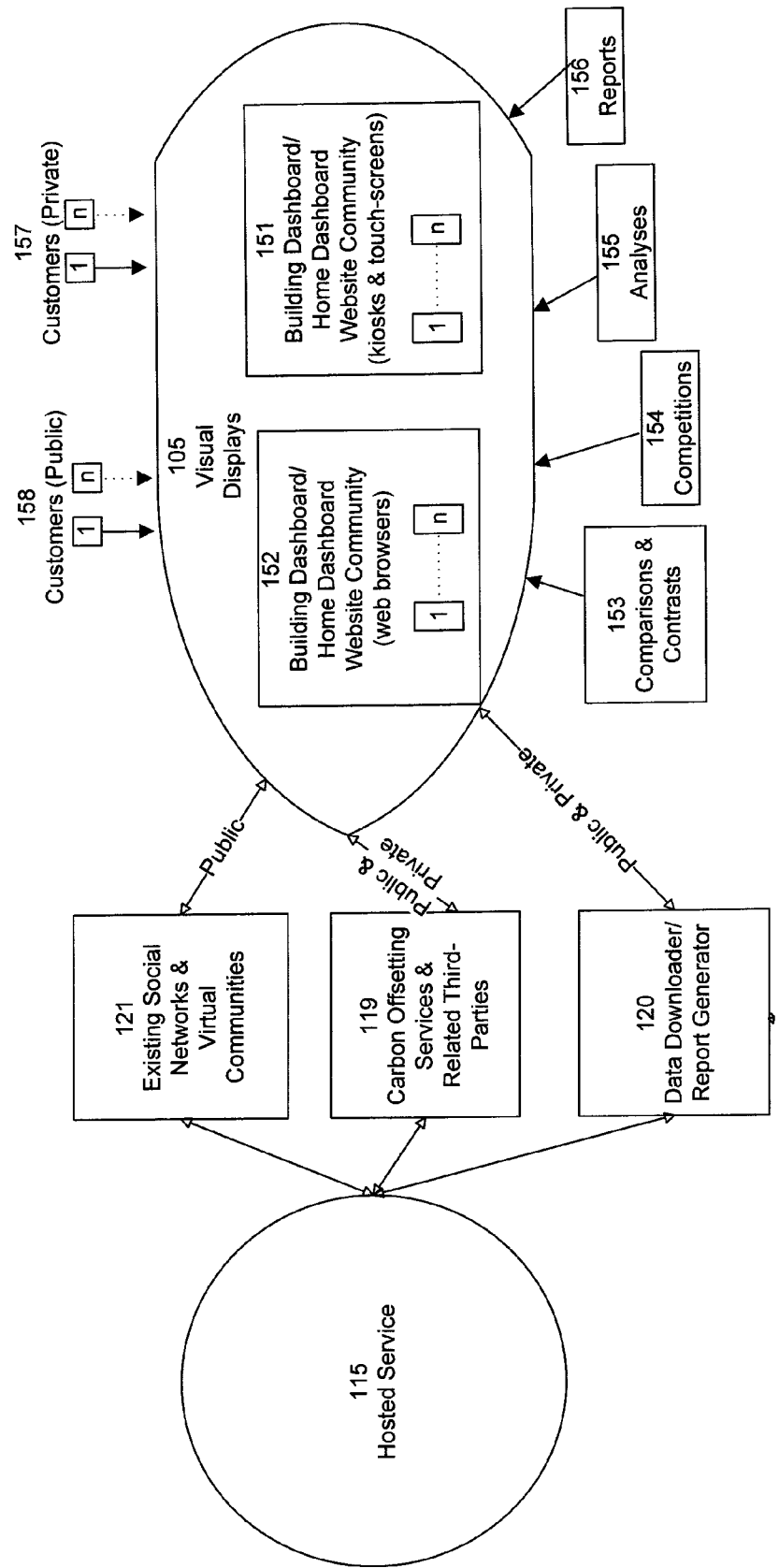
FIG. 1D is a block diagram depicting an architecture for sharing resource usage data among entities according to one embodiment.

Referring now to FIG. 1D, there is shown a block diagram depicting an architecture for sharing resource usage data among entities according to one embodiment. Hosted service 115 is the server-based architecture as depicted in FIG. 1A. Hosted service 115 interfaces with existing social networks and virtual communities 121, carbon offsetting services and related third parties 119, and/or data downloader/report generator 120. Each of these components provides data for display on visual displays 105. Visual displays 105 provide comparisons with data from various sources, including public data 158 from customers or other entities, private data 157 from customers or other entities, comparisons and contrasts 153, competitions 154, analyses 155, and reports 156. Visual displays 105 can include, for example, a dashboard website 152 visible via a browser, and/or a dashboard website 151 visible via kiosks and touchscreens.

In one embodiment, data collection takes place automatically and without user intervention. Referring now to FIG. 1C, there is shown a block diagram depicting an architecture for collecting resource usage data. Resource usage monitoring devices 131 are placed wherever convenient to measure usage. For example, electricity usage data can be collected by power meters located on site where the electricity is being used. Data from monitoring devices 131 is uploaded to a central processing facility 132 for aggregation and storage in database 101. In one embodiment, data is stored locally at or near monitoring devices 131, in a local storage device 133 such as flash memory, RAM, or a hard drive; periodically, data is transmitted from local storage device 133 to central processing facility 132. An entity can specify the frequency with which data are transferred, or can specify that data transfer is to be triggered in response to occurrence of certain events. Data transfer from devices 131 and/or from local storage device 133 to central processing facility 132 can be accomplished using any known data transmission technique, for example via a computer network 134 such as the Internet or other means.

In an alternative embodiment, devices 131 do not store any data locally; rather, devices 131 push data to central processing facility 132, either in response to a trigger event or according to a predefined schedule. In such an embodiment, local storage 133 may be omitted.

Post processing module 103 processes usage data in database 101 according to techniques that are described in more detail below. Such processing can include, for example, comparison, aggregation, normalization, and the like. Data provider 104 extracts processed usage data from database 101 to generate visual displays 105 for presentation to entities. In one embodiment, data provider 104 obtains data via the PHP scripting language, and data provider 104 provides data to the visual displays 105 via XML. Visual displays can then be presented using any technology capable of reading XML.

In one embodiment, web service interface 113 is provided to allow web-based access to database 101 via a graphical user interface 114. In this manner, users and administrators can view and edit data in database 101 and control other operations associated with the collection and display of resource usage data.

Referring now to FIG. 1B, there is shown a block diagram depicting a client-side architecture for practicing the present invention according to one embodiment. In one embodiment, dashboard 117 is provided, to act as a user interface for interacting with hosted service 115. Customers 116 are thereby able to access their data via dashboard 117 which in turn communicates with hosted service 115. In one embodiment, dashboard 117 is able to interact with various third-party features such as social network capabilities 118, carbon offsetting services 119, and data downloading and report generation services 120.

Other mechanisms are also provided for displaying usage data, as shown in FIG. 1B. As will be described in more detail below, usage data can be displayed in the context of existing social networking websites and virtual communities 121. Also, usage data can be shown in a web browser 122, displays and kiosks 123, and the like.

The present invention provides several mechanisms for comparative interactive displays of resource usage data. The Figures depict illustrative embodiments.

Figure 2A:
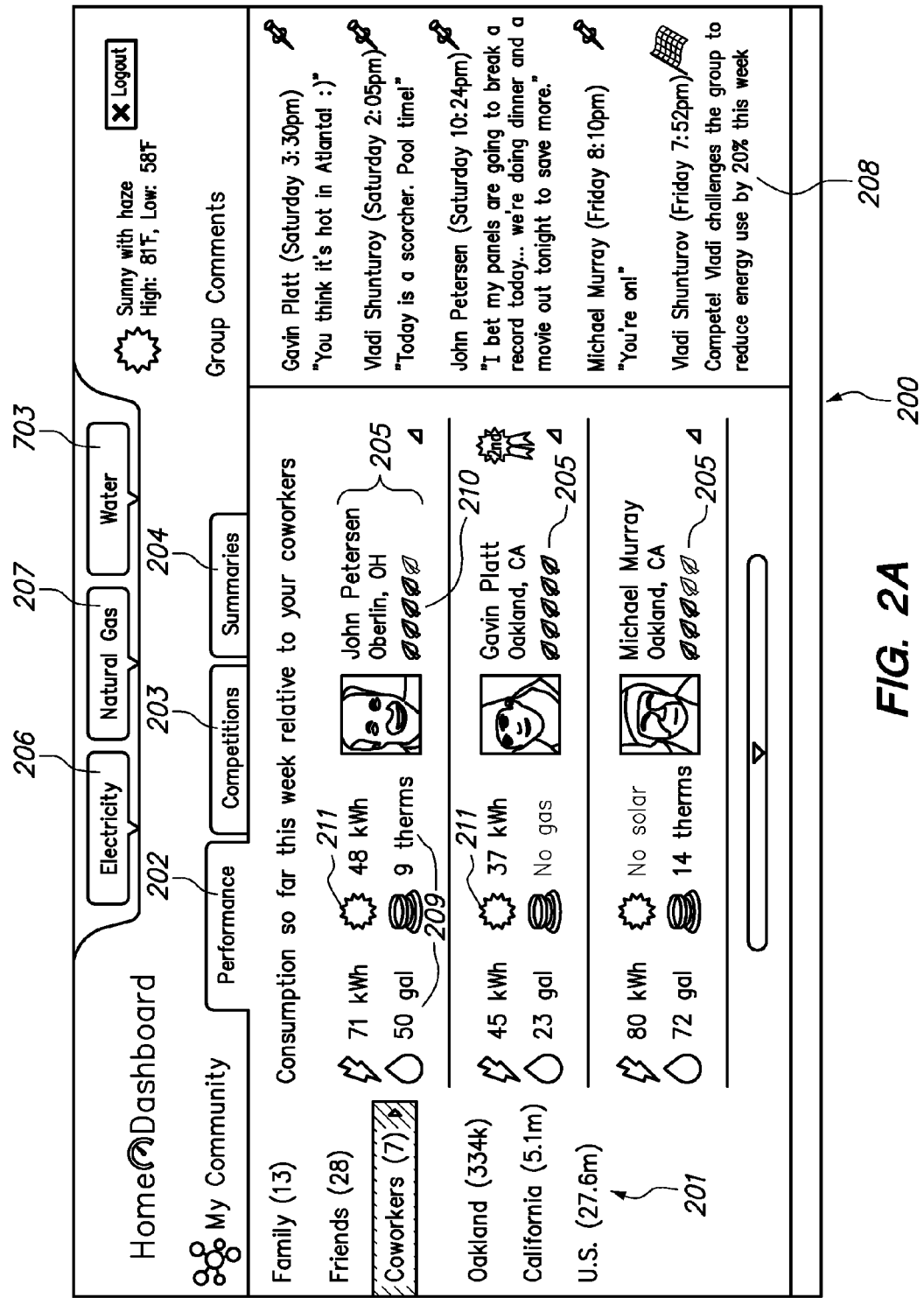
FIG. 2A is a screen shot depicting an example of an interactive display comparing an entity's resource usage with that of other entities within a predefined or user-defined network, according to one embodiment.

Referring now to FIG. 2A, there is shown a screen shot depicting an example of an interactive display 200 comparing an entity's resource usage with that of other entities within a predefined or user-defined network, according to one embodiment. Display 200 can show any or all of resource consumption, production, and/or net use (gross consumption less production) data.

The user can select from various predefined or user-definable groups 201, including for example family, friends, coworkers, and various geographic subdivisions. In one embodiment, the user can tag, label, or categorize entities as belonging to groups. In other embodiments, such categorization is performed in an automated fashion. Groups can include, for example and without limitation, any or all of:
  social, economic or organizational groups, such as businesses, organizations or institutions, friends, family members, coworkers, or other individuals;
  geographic groups, such as individuals residing within or otherwise associated with a particular building or home, business, organization or institution, public utility district or service area, municipality, ZIP code, city, state, region, country, climatic zone or other locale; and sub-groups within social or organizational and geographic groups, such as different floors or wings within a given building, different apartments within a given apartment building, or homes within a given housing development, aggregated groups, or other user-defined networks.

In the example of FIG. 2A, the user has selected the coworkers group. Performance tab 202 provides access to resource usage performance for various members of the selected group 201. Thus, for each displayed member, data 205 is shown including resource consumption 209, identifying data 205, and an overall score 210. As indicated by sun icons 211, two of the entities have solar power production capacity; solar power generation metrics are shown adjacent to the sun icons 211.

Figure 2B:
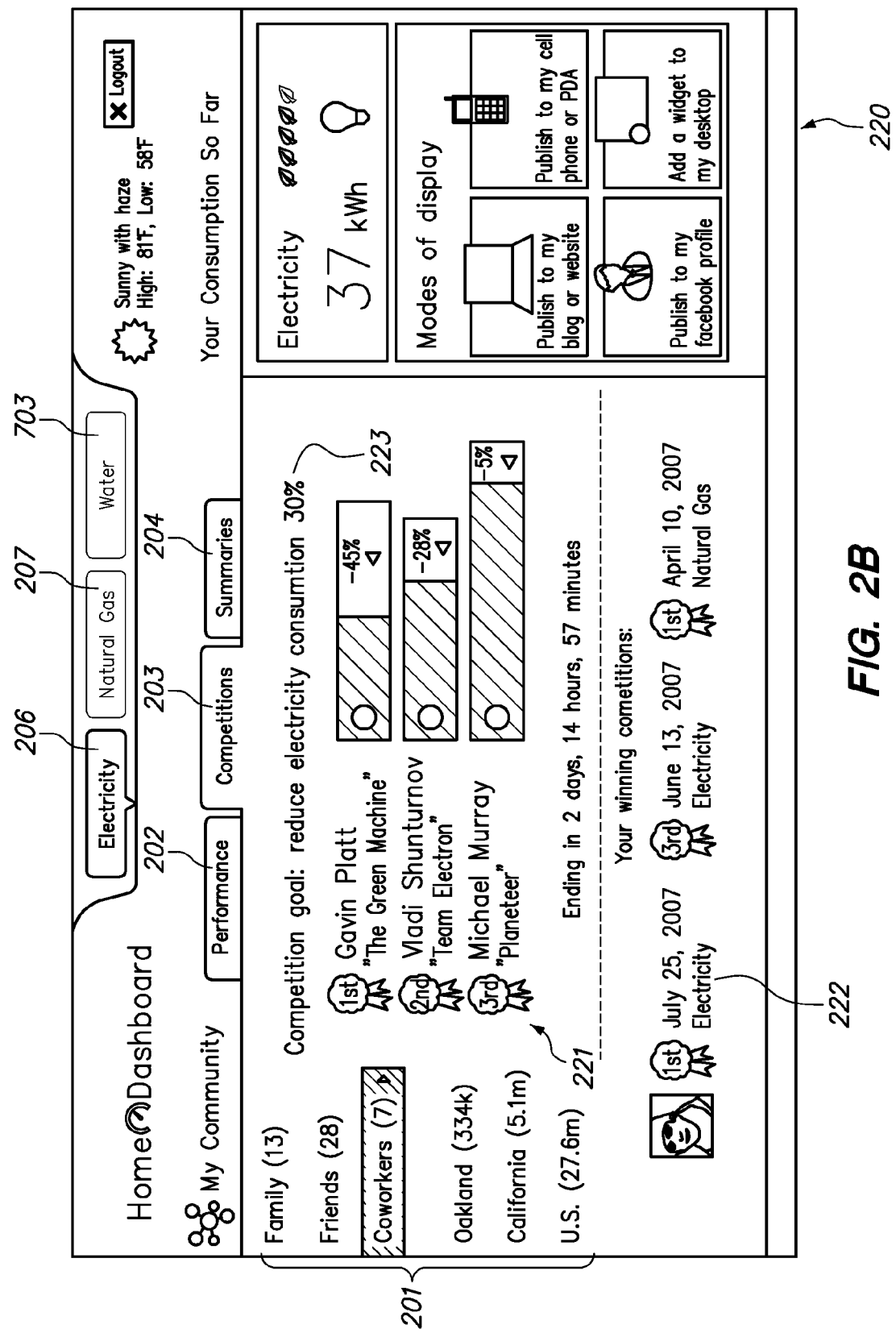
FIG. 2B is a screen shot depicting an example of a competitions screen according to one embodiment.

Competitions tab 203 provides access to various resource usage competitions that may be in progress. Referring now to FIG. 2B, there is shown an example of a competitions screen 220, including a competition goal 223, and rankings 221 of various entities involved in the competition. Also shown is a list of recently won competitions 222. Competition provides an effective way to incentivize resource conservation; accordingly, the present invention provides mechanisms for initiating, responding to, and tracking competitions among entities.

Figure 2C:
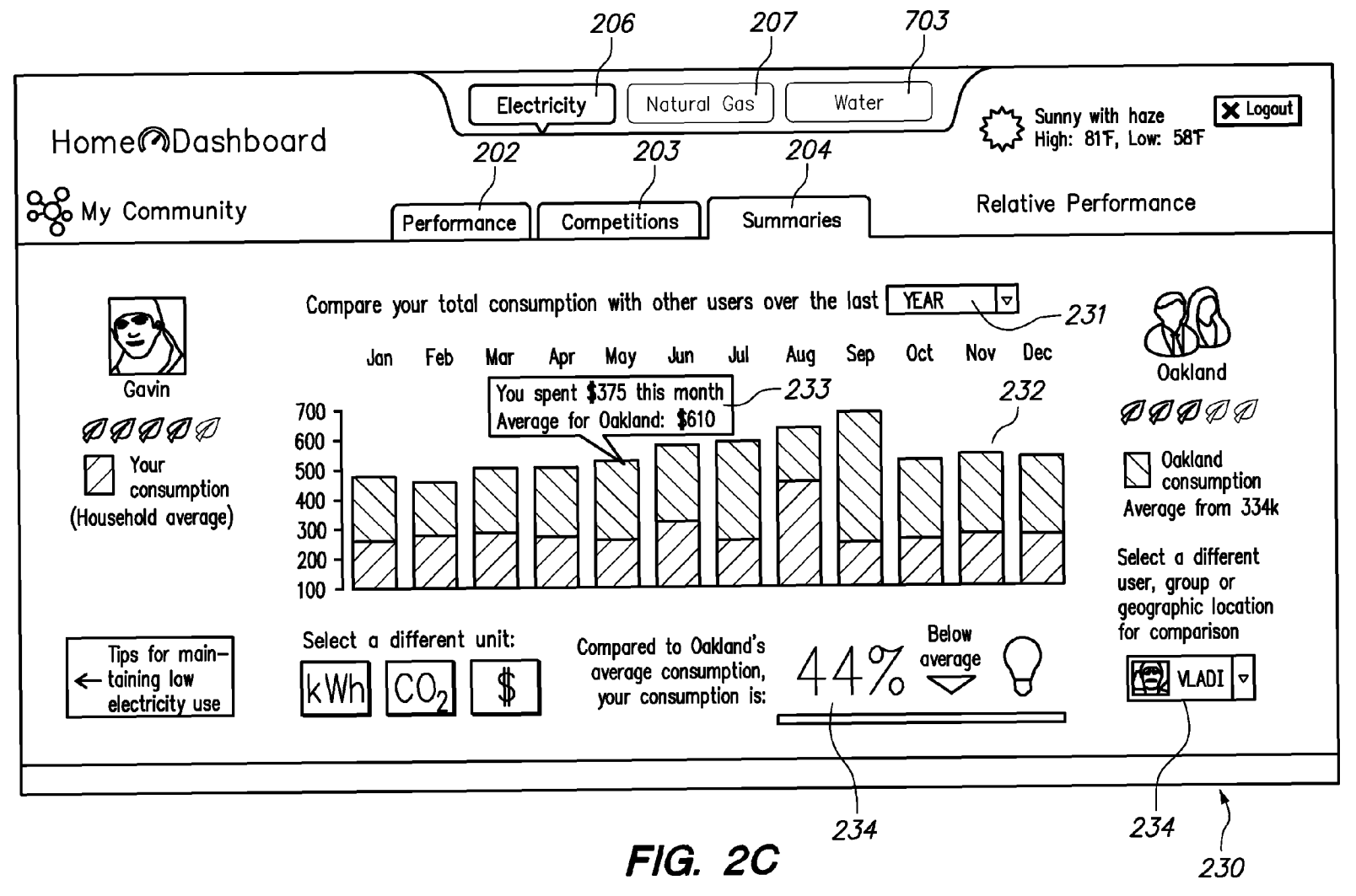

Summaries tab 204 provides access to summary data for resource usage within the selected group 201. Referring now to FIG. 2C, there is shown an example of a summary screen 230. Summary graph 232 shows consumption over a time period selected in pop-up menu 231. Detailed quantitative data is available in pop-up tooltips 233 accessible by hovering over elements of graph 232. In the example shown, graph 232 depicts the user's consumption as compared with an average for the city. A summary 234 of this comparison is also shown. Pop-up menu 234 allows selection of other users, groups, entities, geographic locations, etc., for comparison.

Group comments 208 area provides a place where members of the group can post comments and announcements.

Electricity button 206 provides access to displays that focus on electricity usage. Natural gas button 207 provides access to displays that focus on natural gas. Water button 703 provides access to displays that focus on water.

Figure 3:
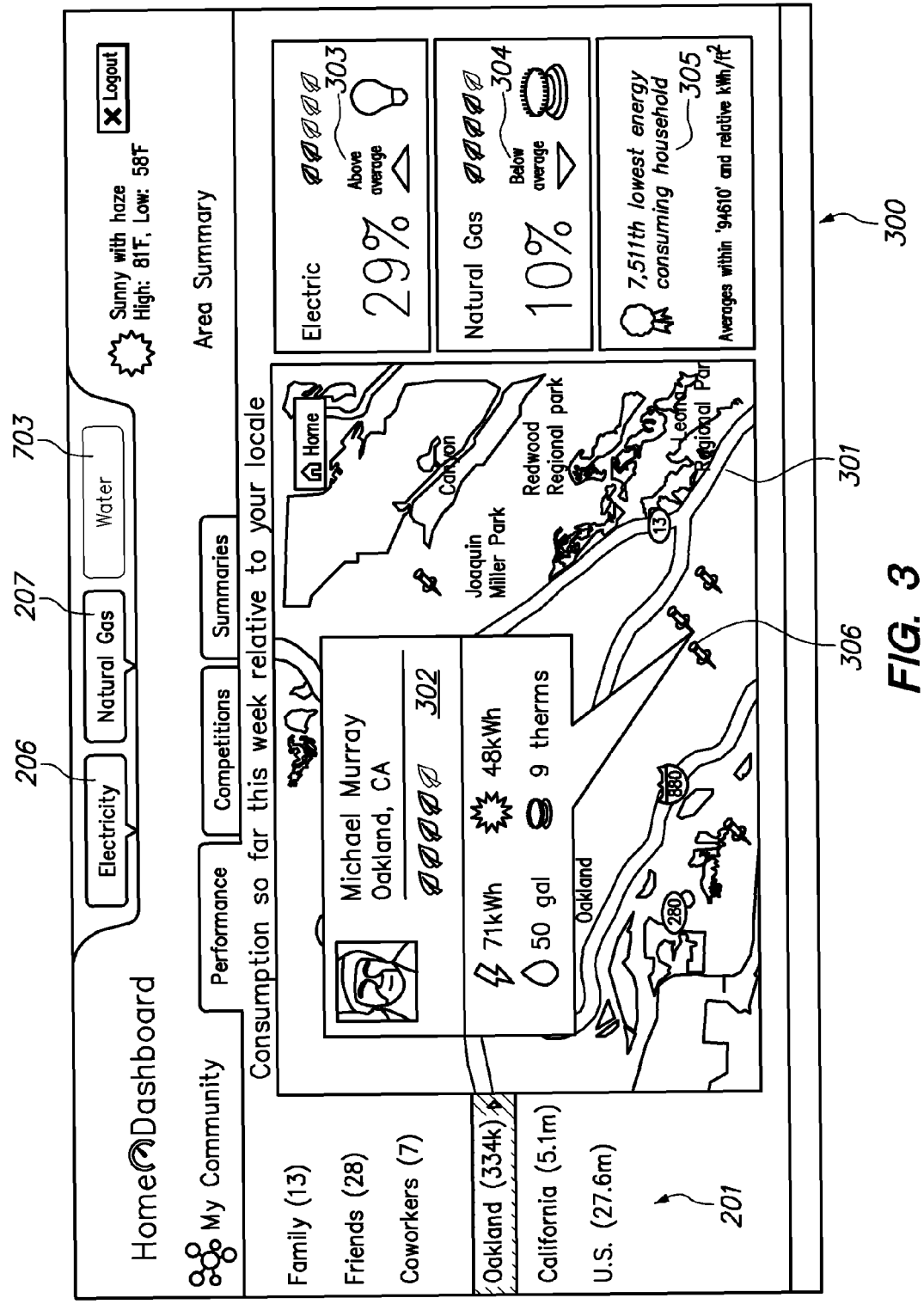
FIG. 3 is a screen shot depicting an example of an interactive display comparing an entity's resource usage with aggregated usage data, according to one embodiment.

Referring now to FIG. 3, there is shown a screen shot depicting an example of an interactive display 300 comparing an entity's resource usage with aggregated usage data for a geographic region, according to one embodiment. Here, the user has selected, from groups 201, the group corresponding to a geographic subdivision, namely Oakland. Map 301 depicts the selected area. Pin 306 indicates the entity's location within the region. In one embodiment, other pins 306 can be shown on map 301, representing other resource consumers that can be selected. The user clicks on pin 306 to see data popup 302 depicting information about the entity corresponding to pin 306. Pane 303 shows electricity usage for the entity corresponding to the selected pin 306, expressed as a comparison with the overall average for the region. Pane 304 shows natural gas usage for the entity corresponding to the selected pin 306, expressed as a comparison with the overall average for the region. Pane 305 shows overall rank for the entity corresponding to the selected pin 306, within the geographic region depicted.

Display 300 thus provides an interactive, flexible, and intuitive mechanism for comparing an entity's resource usage with that of the larger geographic community. As can be seen from FIG. 3, the geographic area that is used as a basis for comparison can be of any size, including for example cities, states, or countries.

In one embodiment, a similar display can be used to present comparisons of resource usage over time. Thus, the user can compare any or all of the following for an entity's resource usage (including consumption, production, and/or net use):

real-time resource usage for the entity;

near-real-time resource usage acquired over different time intervals (e.g. 1 minute, 5 minutes, 15 minutes, 1 hour, 1 day, 1 month, etc.);

real-time or near-real-time resource usage acquired over a given regular interval, stored, and transmitted or broadcasted on a lower-resolution interval in a batch (e.g. twenty-four 1-hour resolution data points sent once per day); and aggregated, totalized, or averaged resource usage.

The data used in such comparative displays can be acquired from either identified or anonymous individuals or groups calculated on the basis of or at the resolution of a particular building or home, organization or institution, public utility district or service area, municipality, ZIP code, city, state, region, climatic zone, country, or other sub-group or user-defined network.

Figure 4:
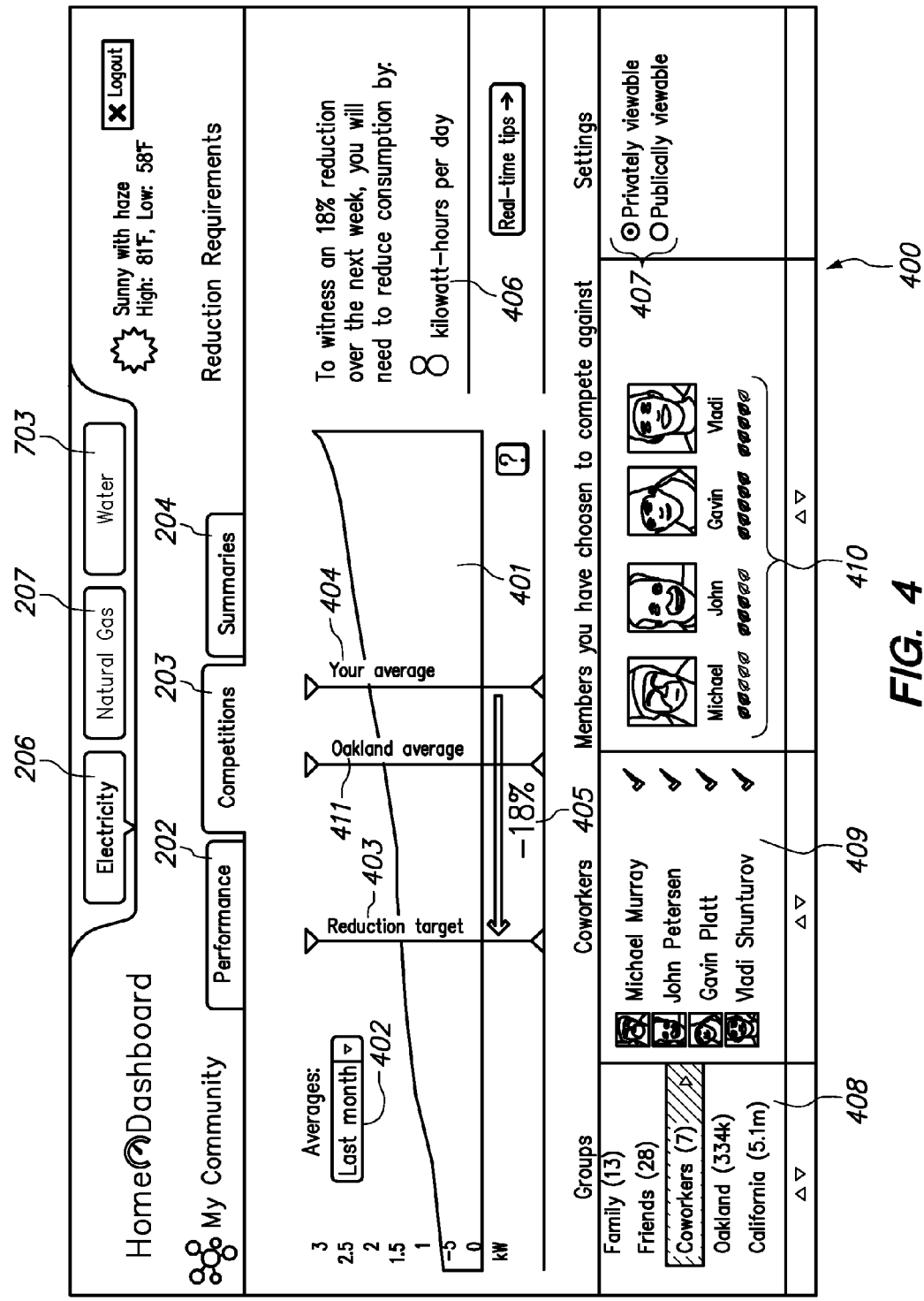
FIG. 4 is a screen shot depicting an example of an interactive display comparing resource usage of members of a group or network with one or more reduction goals, according to one embodiment.

Referring now to FIG. 4, there is shown a screen shot depicting an example of an interactive display 400 comparing resource usage of members of a group or network with one or more reduction goals, according to one embodiment. In one embodiment, the entity can set privately or publicly viewable resource usage budgets and/or reduction goals (also referred to as targets), and can then privately or publicly contrast or compete with either identified or anonymous entities to meet or exceed these budgets or goals. Display 400 provides various views into the goals, as well as mechanisms for setting parameters and options.

In one embodiment, the user accesses display 400 by clicking on competitions tab 203. Graph 401 shows average resource usage over a time period that is selected in pop-up menu 402. Graph 401 also includes graphical indications of the reduction goal 403, the average 411 for a relevant geographic region, and the entity's average usage 404 over the specified time period. The reduction goal is also shown as a percentage value change 405 from the current average usage to the goal. Display 400 also includes an indication 406 of the real-world consumption reduction amount that is needed to achieve the reduction goal.

Radio buttons 407 allow the user to specify whether the data is to be made publicly viewable. The user can also select from a list 408 of groups, and can then select members of the group from list 409. The selected members appear in pane 410, representing those entities with which the user has chosen to contrast or compete.

The interface shown in FIG. 4 thus provides a mechanism for measuring an entity's success in achieving a reduction goal. The interface also provides a mechanism for engaging in competition with other entities in attempting to achieve goals. The user submits a request to other users to join a particular competition. After accepting the request, the other users are featured in a common interface in which the relative performance of each user is viewable on-screen. In the event that a user wishes to privately contrast or compete against a particular user, users, or other group, the user may select available user(s) or group(s) to compare relative performance against the user's own performance. In this way a user may attempt to meet a budget or achieve a reduction goal privately or anonymously through the understanding, motivation, or encouragement gained from viewing one's own consumption relative to the consumption of other users or groups.

Figure 5:
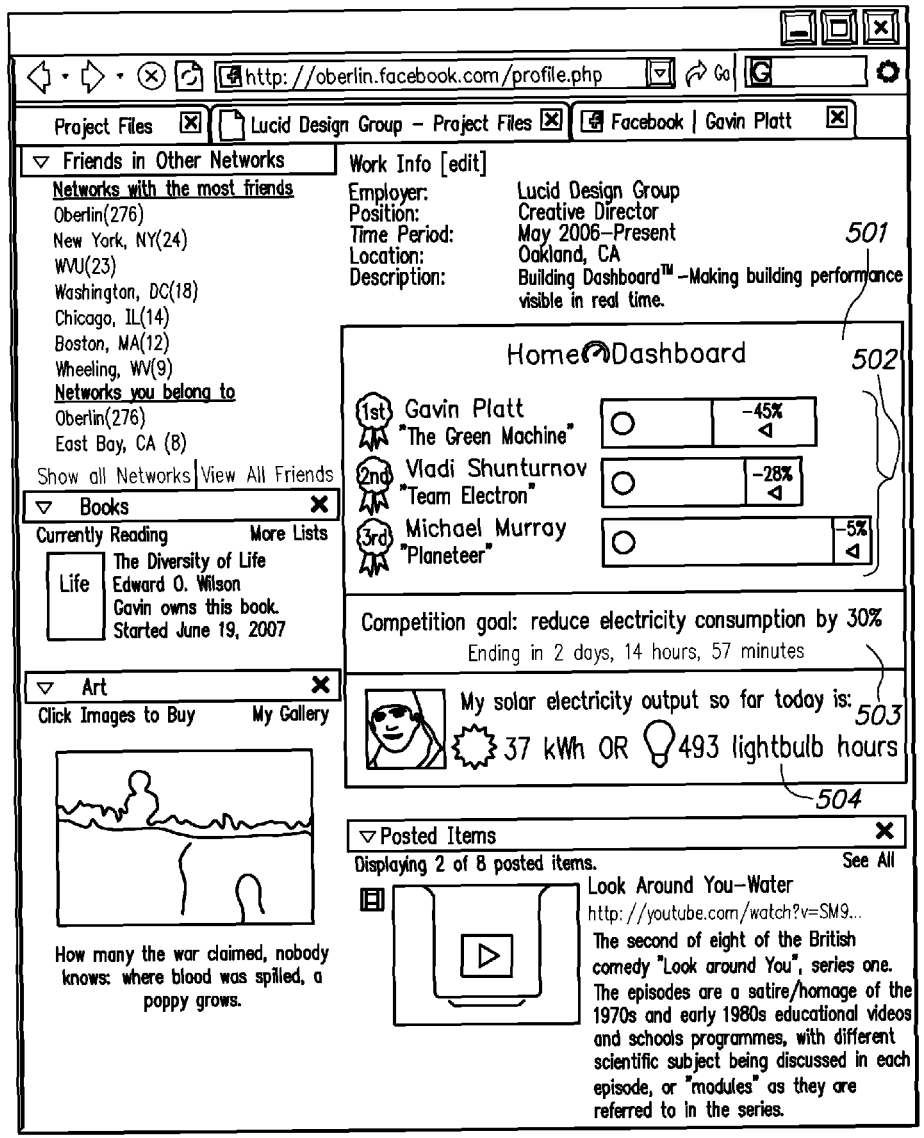
FIG. 5 is a screen shot depicting an example of an interactive display comparing an entity's resource usage with other entities in the context of a social networking system or virtual community, according to one embodiment.

Referring now to FIG. 5, there is shown a screen shot depicting an example of an interactive display 500 comparing an entity's resource usage with other entities in the context of a social networking system or virtual community, according to one embodiment. In one embodiment, the present invention allows an entity to directly link, broadcast, and/or publish individual or group resource usage data and comparative individual or group resource usage to existing social networking systems, such as Facebook, MySpace, and Bebo, and other social networks and virtual communities. Data can also be published to specialized social networks that are designed for sharing of resource usage data. Such a mechanism allows entities to share resource usage data with other individuals in an existing networking infrastructure. In addition, in one embodiment the present invention provides an interactive forum associated with the shared resource usage data. Entities can use the interactive forum to discuss conservation tips and strategies, post messages alerting others of news and new technologies, and the like. Such a forum is useful for fostering an online community for sharing and discussing publicly displayed comparative data regarding resource usage. The presence of an online community can help motivate entities to increase their conservation efforts.

As shown in FIG. 5, display 500 includes dashboard pane 501 providing resource usage data. Within pane 501, any combination of resource usage data can be shown. The example depicts a ranking 502 ($1^{st}$, $2^{nd}$, and $3^{rd}$) comparing resource usage reduction for three entities, including graphical and numerical presentations of the reduction. A summary 503 of an ongoing competition is shown, specifying the reduction goal and the time period. Also shown in dashboard pane 501 is the entity's current solar electricity output 504. One skilled in the art will recognize that the particular data shown in FIG. 5 is merely exemplary, and that the user can select many different types of usage data and presentations thereof to be shown within a social network page.

In one embodiment, comparative displays are normalized so as to provide more a meaningful visual presentation. Thus, resource usage as shown in FIG. 5 and other displays can be standardized so that they show per-person, or per-area usage. Normalization can also be performed based on any other calibration metric, as appropriate.

In one embodiment, data shown in dashboard pane 501 is updated in real-time or on a periodic basis.

Figure 6:
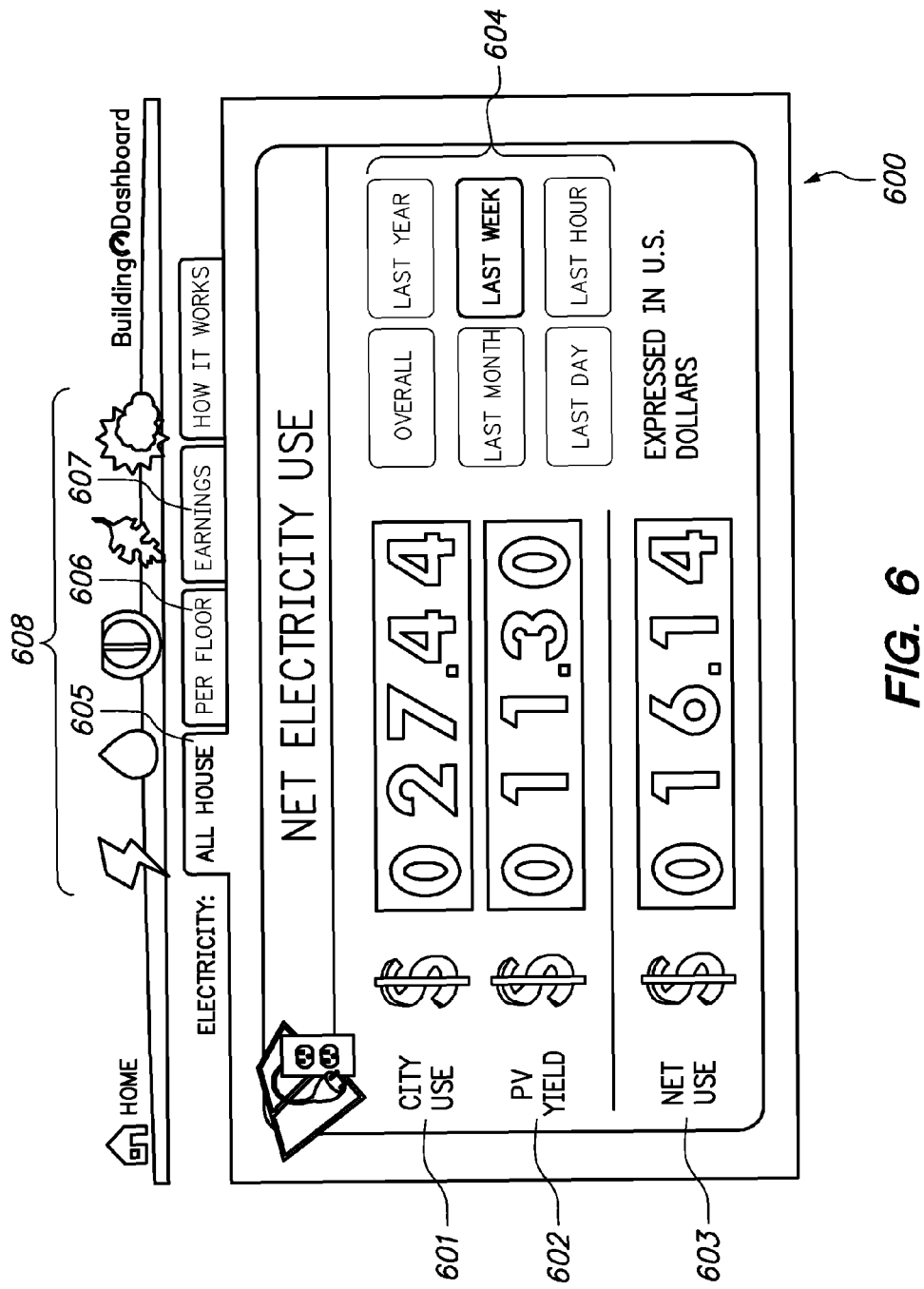
FIG. 6 is a screen shot depicting an example of an interactive display comparing resource consumption, solar photovoltaic yield, and net usage data from renewable energy technologies, according to one embodiment.

Referring now to FIG. 6, there is shown a screen shot depicting an example of an interactive display 600 comparing resource consumption 601, solar photovoltaic yield 602, and net use data 603 from renewable energy technologies, according to one embodiment. Display 600 thus provides real-time feedback as to an entity's electricity usage and yield. The user can click on tabs 605 or 606 to see data for an entire household or a per-floor breakdown. Earnings tab 607 provides access to a history of earnings resulting from PV yield. Icons 608 provide access to similar data for other types of resources, including electricity, water, natural gas, and the like. Buttons 604 allow the user to break data down by time period. Referring also to FIG. 2A, there is shown an example of a comparative display showing solar energy production of entities. As indicated by sun icons 211, two of the entities have solar power production capacity; solar power generation metrics are shown adjacent to the sun icons 211.

The interface shown in FIG. 6 thus provides a mechanism allowing entities to incorporate, analyze, compare, and display resource usage and savings through conservation and efficient technology, including net energy or water consumption, as well as earnings data from sustainable or renewable technologies. Such data can be shown independently or in conjunction with comparative data, for the purposes of comparison, analysis, and competition.

Figure 7:
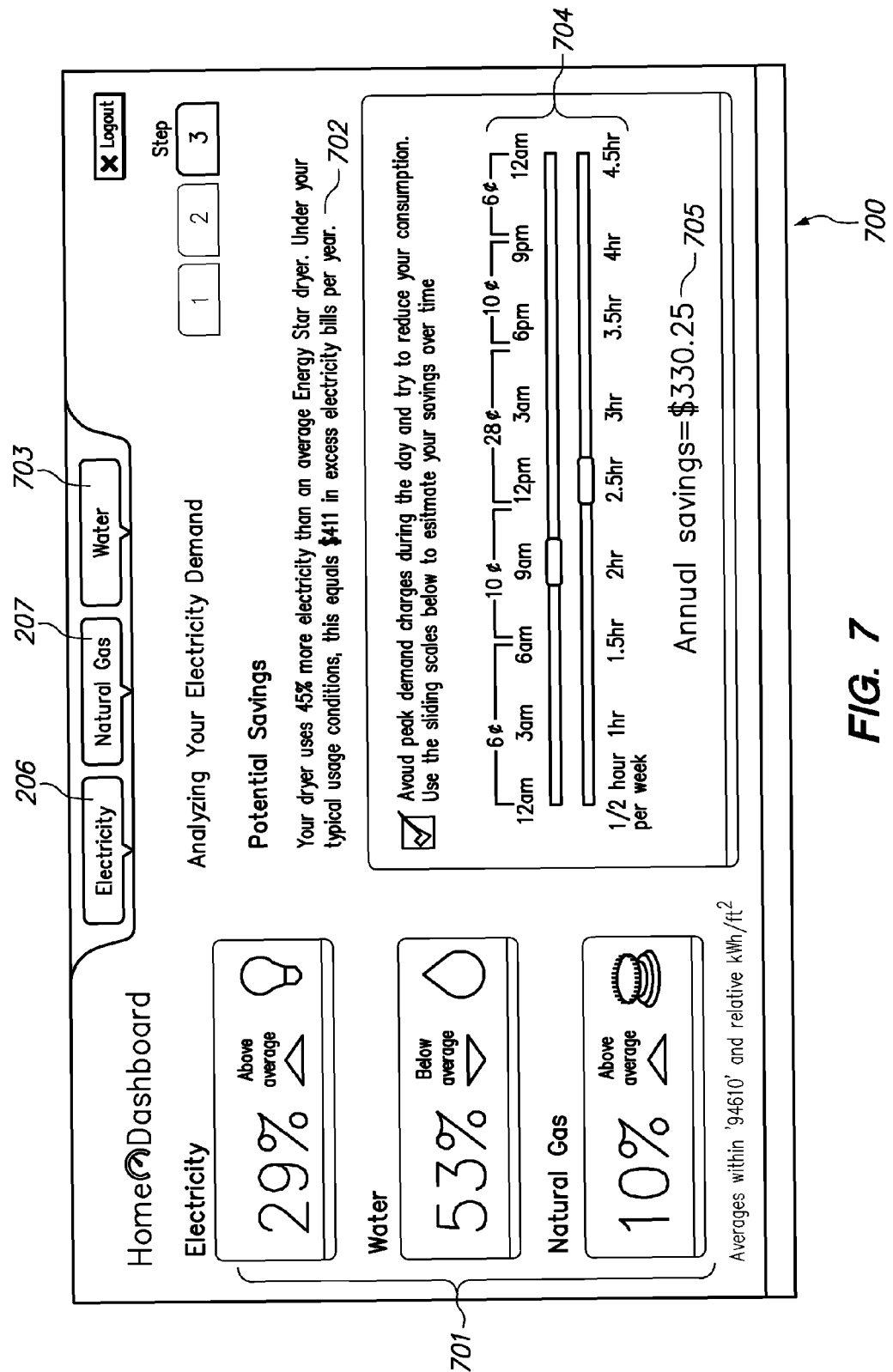
FIG. 7 is a screen shot depicting an example of an interactive display showing resource usage on a per-appliance basis, and comparing results to a database of demand and performance for individual appliances, according to one embodiment.

Referring now to FIG. 7, there is shown a screen shot depicting an example of an interactive display 700 showing resource use demand on a per-appliance basis, and comparing results to a database of demand and performance for individual appliances, according to one embodiment. Display 700 allows an entity to quantify, analyze, and display building or home resource usage on a per-area, per-building, per-zone, per-wing, per-floor, per-room, per-appliance, per-occupant, or per-load basis. Results can be compared to a specified range or average value of resource usage associated with any entity or network over any given time interval. Results can also be compared to a database of resource usage performance standards per locale, jurisdiction, or other authority. Results can also be compared to a database of resource usage demand and performance per individual appliance on the basis of type, size, load, name brand, geographic location, or other metric.

In one embodiment, as shown in FIG. 7, analysis of different resources can be accessed by clicking on tabs 206, 703, or 207. Usage summary 701 shows current usage as a percentage variation from averages. Section 702 shows potential savings by indicating resource usage for a particular appliance (or floor, area, etc.) as compared with an average. Sliding scales 704 provide a user interface allowing the user to indicate adjusted consumption times and to view an indication 705 of annual savings that would result from the proposed adjustments.

Display 700 thus provides an example of a user interface for analyzing performance of a particular appliance, comparing resource usage with other appliances of the same type, and exploring options for changing usage patterns to save money.

Data Collection

In one embodiment, the present invention includes systems for automatically measuring and collecting resource usage data from public energy utilities, water utilities, and the like. In another embodiment, such data can be collected by interfacing with existing resource usage measurement systems, such as power meters, gas meters, water meters, and the like.

Data can be collected on a continuous basis or according to some periodic methodology. Existing metering technologies are communicatively coupled to the system of the present invention to automatically collect and provide real-time (or near-real-time) resource usage data for comparison with collected baseline data. From this data and comparative analysis, the present invention is able to generate the above-described displays that provide mechanisms for monitoring and analyzing resource usage in buildings and homes.

When automated data collection is not available, an interface is provided that allows entities to manually input data readings gathered from energy or water use utility meters, or from manual measurements of environmental variables such as weight or volume of recycled or composted materials over any time scale. Alternatively, entities can upload and integrate other databases of archived data or predicted performance data. Thus, even when direct, automated data collection is not available, the data displays and comparative analyses discussed above can still be implemented. Alternatively, such manually-entered data can be used to supplement automatically collected data, particularly when gaps exist in the automatically collected data or when prior use patterns have not been established.

Collected data can be stored and presented to entities in its original state, referred to herein as "acquired data". Acquired data are data that are delivered from the entity to the central data storage repository before being further processed for display.

However, it is often useful to generate derived data from the acquired data. Derived data can include any data that is generated by performing calculations on the acquired data. Derived data can therefore include, for example, aggregations, averages, projections, maxima, minima, goals, targets, percentages, variances, standardizations, normalizations, and the like. In one embodiment, resource usage data is presented in the context of the present invention in its original form, derived form, or any combination thereof. Processing of acquired data to generate derived data can take place at the data collection site or at hosted service 115. Alternatively, derived data can be generated at the time of presentation of data, for example when displays or reports are being generated for end users.

Downloading and Reporting Archived Data

Figure 8:
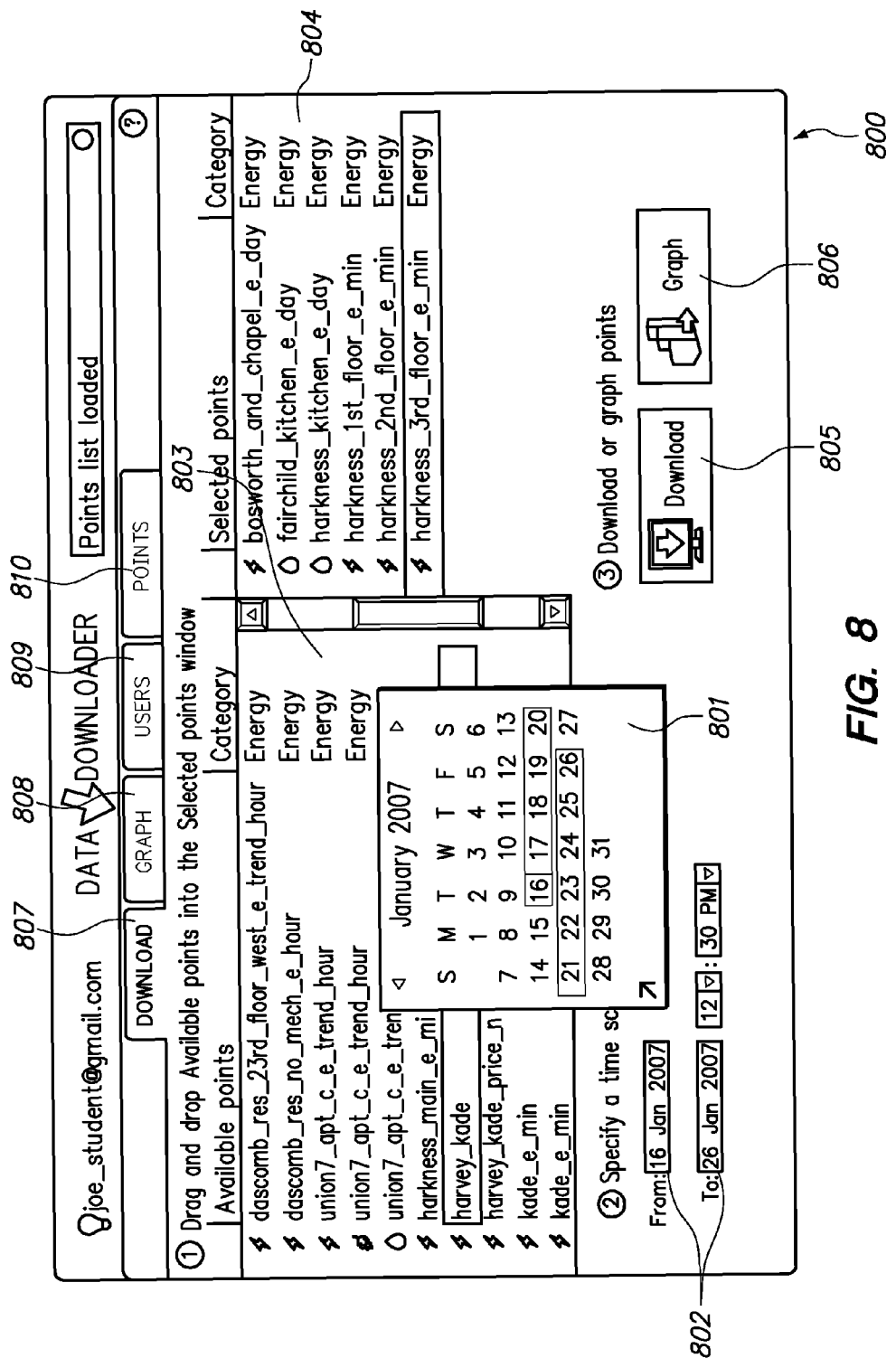
FIG. 8 is a screen shot depicting an example of a user interface for accessing and downloading acquired and derived data points for a date range, according to one embodiment.

Referring now to FIG. 8, there is shown a screen shot depicting an example of a user interface 800 for accessing and downloading acquired and derived data points for a date range, according to one embodiment. In one embodiment, the user interface 800 can be used for downloading data into a comma-delimited file (such as a CSV file), spreadsheet applications, and/or any other format. In this manner the data collected and processed by the present invention can be used for other purposes including additional analysis, processing, publication, and the like.

In one embodiment, the user can specify particular types of data, ranges, and other criteria for the data download. The user interface 800 of FIG. 8 illustrates an example where pop-up pane 801 allows the user to select a date range. The date range can also be selected by entering text in fields 802. The user can also drag selected data points (variables) from available points list 803 to selected points list 804; the data download will then include all points in selected points list 804. Data points can include variables that are manually entered, automatically acquired, or derived.

In this manner, the user can specify any or all acquired, derived, and manually inputted data points. The user clicks on download button 805 to download the selected data.

In one embodiment, user interface 800 is also used for generating graphs of selected data. The user selects date ranges and/or points as described above, then clicks on graph button 806 to generate a graph of the selected data. In addition, tabs 807, 808, 809, 810 provide access to other functionality, including downloading, graphic, entity data, and points, respectively. The graph tab 808 generates graphs from selected points over the specified time scale. The users tab 809 allows an administrator to change data point access for a particular user or group. The points tab 810 allows data points to be added, removed, or categorized.

Additional Functionality

The acquired resource usage data can be used for other purposes as well. In one embodiment, the present invention provides additional functionality to make use of the data. The following are examples of such functionality.

Demand forecasts. The present invention can provide an interface presenting forecasts of resource usage, including consumption, production, and/or net use. Such forecasts can be derived by extrapolation from any or all of historical data, real-time or near-real-time data, and the like. The forecasts can then be used as a tool for encouraging, assisting with, or facilitating resource usage reductions.

Figure 2D:
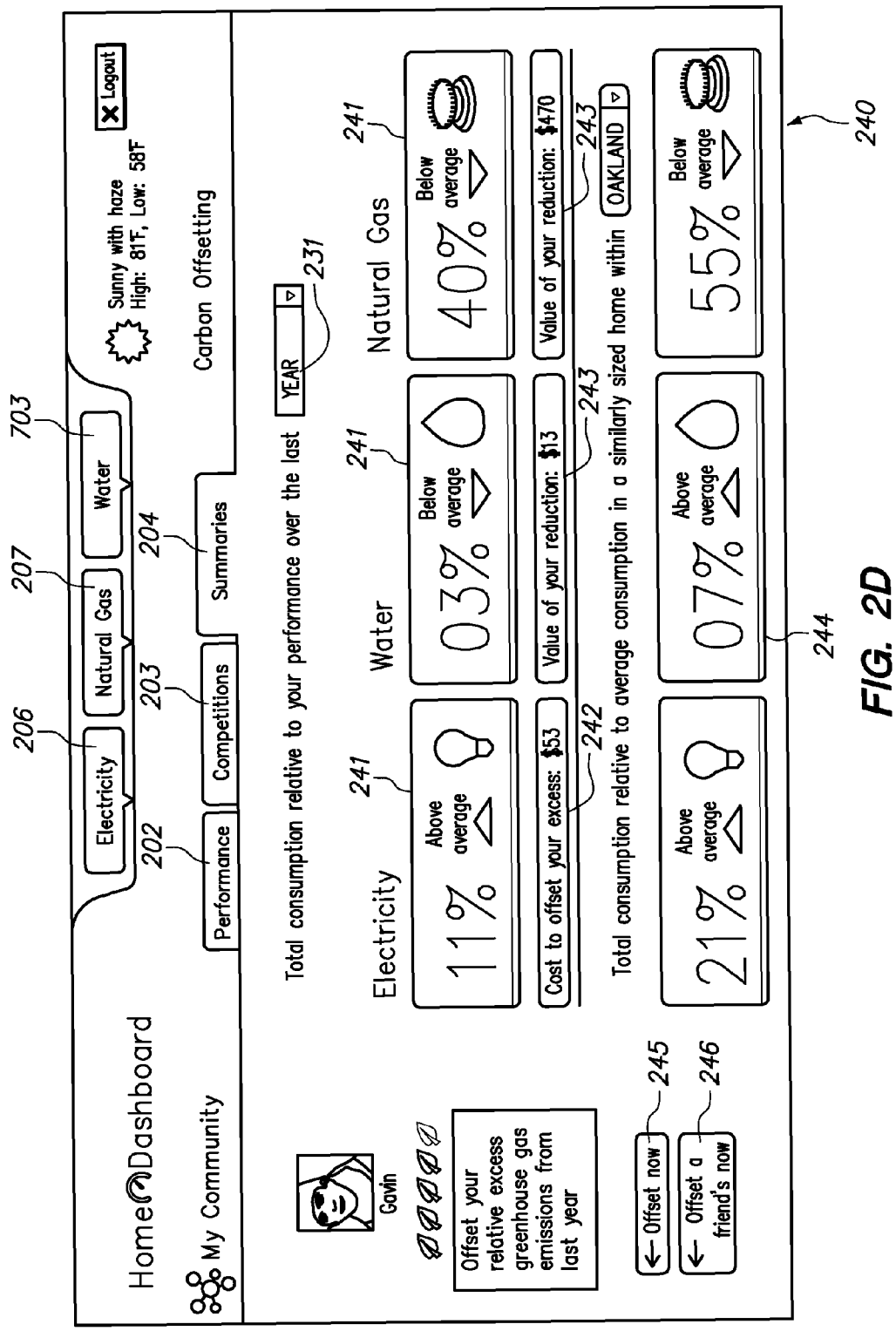
FIG. 2D is a screen shot depicting an example of a summary screen including offset options according to one embodiment.
Figure 2E:
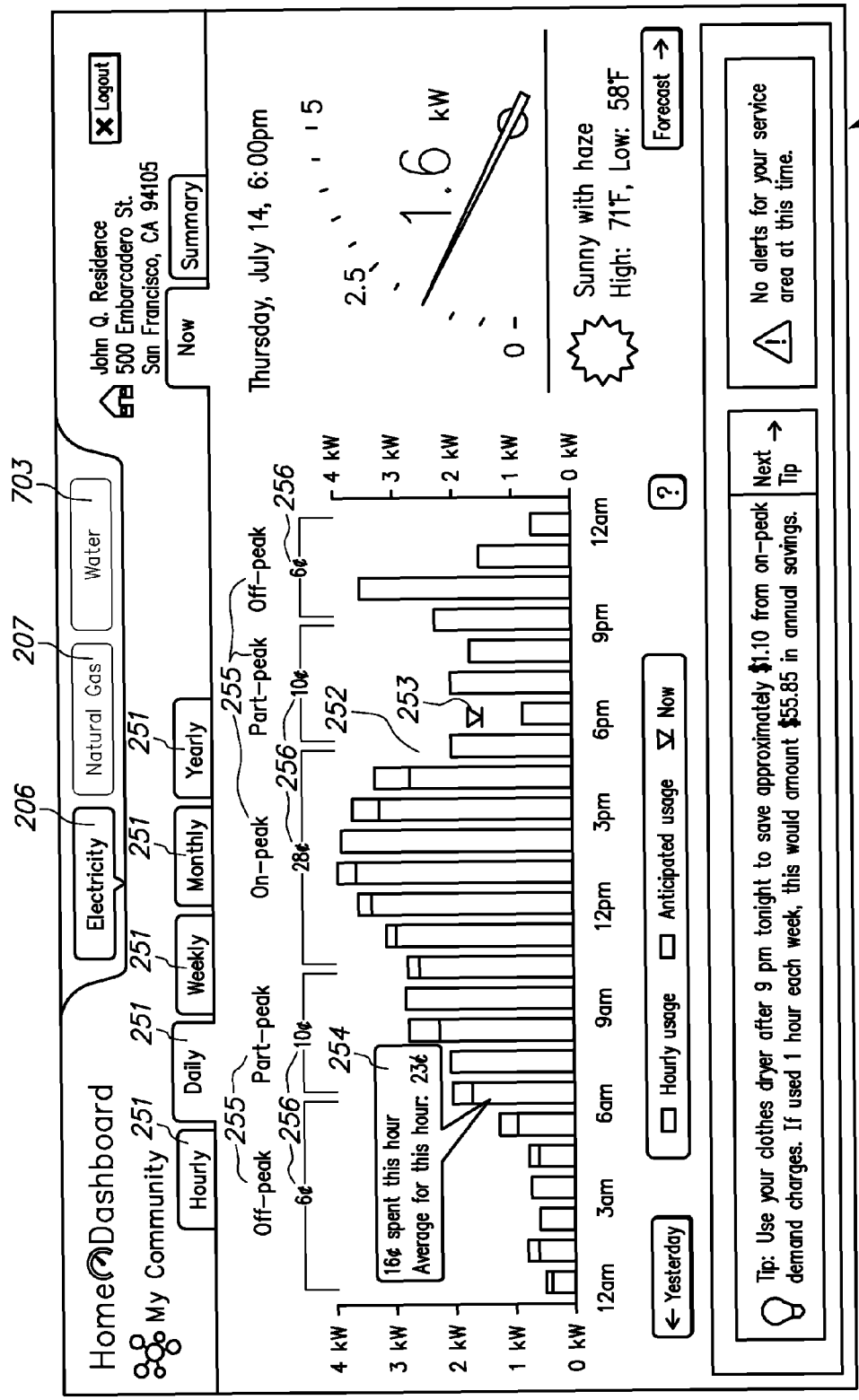
FIG. 2E is a screen shot depicting an example of a daily usage screen showing usage per time of day according to one embodiment.

Peak demand costs and tiered rates. The present invention can provide an interface for setting, viewing and/or adjusting for charge rates for resources, including for example peak demand, seasonal, and/or consumption-level charge rates. Data acquired and processed according to the techniques described above can be used to visualize and translate the costs of resource usage at different times of a day or season, in a particular utility area, or at different consumption levels, and to measure changes in resource usage resulting from visualized rate change or rate variation information. Referring now to FIG. 2E, there is shown an example of a daily usage screen 250 showing usage per time of day according to one embodiment. Tabs 251 allow selection of various usage screens, including hourly, daily, weekly, monthly, and yearly. Graph 252 visually depicts resource usage according to the selected time period, including actual usage and/or anticipated usage. Pop-up tooltip 254 provides detailed information for a particular portion of graph 252, responsive to hovering a cursor at a particular location. Now indicator 253 indicates a current time and/or date. Peak indicators 255 denote which time periods are peak, part-peak, and off-peak; corresponding resource costs 256 can be shown for the denoted time periods.

Selling or trading green attributes or purchasing carbon offsets. The present invention can provide an interface for tracking, making available, trading, and/or purchasing renewable energy credits, certificates, and/or green tags, and/or to purchase carbon offsets through third-party services such as TerraPass or CarbonFund. Such functionality can be integrated with other functionality of the present invention. In addition, the present invention provides, in one embodiment, functionality allowing entities to transact with one another with respect to present or future property rights to environmental benefits of renewable energy generation or resource use reductions. Referring now to FIG. 2D, there is shown a screen shot depicting an example of a summary screen 240 including offset options according to one embodiment. Summary data 241 for resource usage is shown. For those resources where usage is above average, an indication 242 of the cost to offset the excess is shown. For those resources where usage is below average, an indication 243 of the value of the reduction is shown. Comparative data 244 is also shown, for example for a city or other geographic region. Offset button 245 provides a link to a screen (not shown) for offsetting the entity's excess resource usage. Offset button 246 provides a link to a screen (not shown) for offsetting another entity's (such as a friend's) excess resource usage.

Accessibility. The present invention also provides, in one embodiment, an interface allowing an entity to control accessibility of data. Different entities can be given different permission levels for viewing or sharing data. Such permissions can also be assigned according to a role-based paradigm. System administrators can be given the ability to impose accessibility parameters on individual users or entities.

Figure 2F:
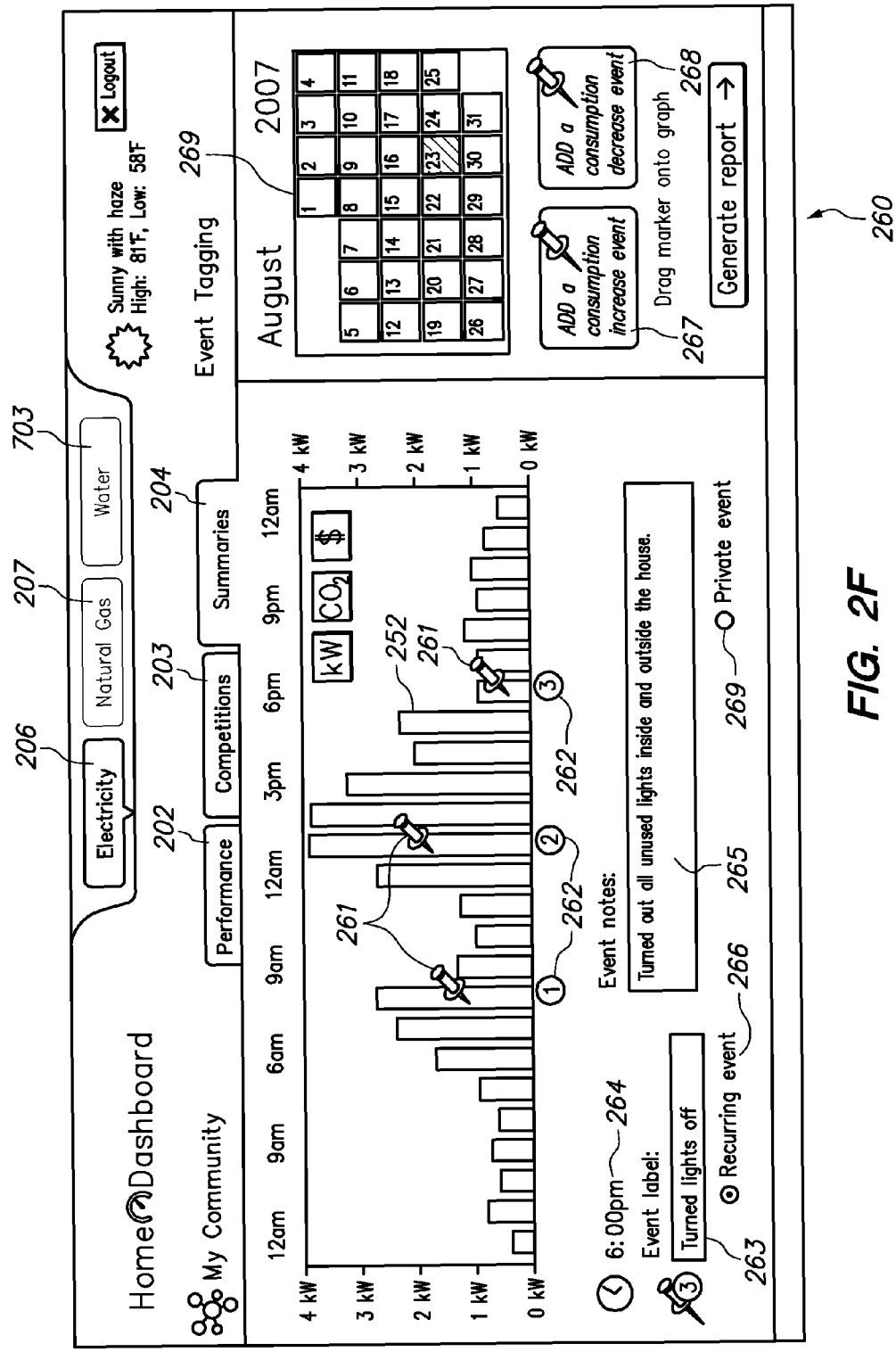
FIG. 2F is a screen shot depicting an example of a screen for tagging events associated with resource usage, according to one embodiment.

Event tagging. In one embodiment, the present invention allows entities to tag certain events, such as installation of a new energy-saving device or a change in settings, in the context of a graphical display of resource usage data. These tagged events then appear in subsequent displays or reports so that the entity can determine the magnitude of the effect on resource usage. In this manner, the present invention helps entities determine which changes are most effective in managing consumption. Furthermore, other events and information can be associated with the resource usage data and with other events, such as weather conditions and seasonal charge rate fluctuations. Referring now to FIG. 2F, there is shown a screen shot depicting an example of a screen for tagging events associated with resource usage, according to one embodiment. Graph 252 depicts resource usage over a time period. The user can add an event tag to graph 252 by dragging a marker from box 267 or 268 onto graph 252. In the example, three event tags 261 have been added. Each event tag 261 is numbered 262. Additional information is also provided for events, including for example label 263, time 264, recurrence indicator 266, and notes 265. In one embodiment, all of these descriptive elements of an event are user-editable. The user can also indicate, in radio button 269, whether the event is a private one (in other words, whether or not it should be made visible to others). The user can navigate to other dates via calendar 269.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for collecting, comparing, and displaying resource usage data, comprising:

receiving, by a processor and via an interactive competitions screen of a user interface, a request to initiate a competition among a plurality of resource consumers, wherein performance of each resource consumer within the competition is based on the resource consumer's reduction in resource usage over a period of time;

transmitting, by the processor, a request to at least one resource consumer to engage in the competition;

receiving, from at least one resource consumer, an acceptance of the transmitted request;

initiating the competition;

collecting, by the processor, resource usage data associated with a first resource consumer engaged in the competition;

storing the collected resource usage data in an electronic storage device;

retrieving, by the processor, stored resource usage data associated with at least two resource consumers engaged in the competition;

assessing, by the processor, performance of each resource consumer engaged in the competition by determining the resource consumer's reduction in resource usage over a period of time;

comparing, by the processor, the assessed performance of the resource consumers engaged in the competition; and displaying the results of the comparison at an output device, the displayed results comprising a comparative representation of resource consumer performance based on each resource consumer's reduction in resource usage.

2. The method of claim 1, further comprising:

processing, by the processor, the collected resource usage data;

and wherein storing the collected resource usage data in an electronic storage device comprises storing the processed resource usage data in the electronic storage device.

3. The method of claim 1, wherein each resource consumer comprises at least one selected from the group consisting of:

an individual;
a family;
a group;
a corporation;
an organization;
an institution;
at least one division within an organization;
at least one department within an organization;
a building;
a municipality;
a geographically defined set of entities;
a utility district;
a service area;
a zone;
a sub-zone;
a climatic zone;
a residence;
a floor;
a room; and
an office.

4. The method of claim 1, further comprising:

receiving, by the processor, a definition of a group of resource consumers; and displaying, at the output device, comparative resource usage data associated with the resource consumers in the group.

5. The method of claim 4, wherein the definition comprises at least one of a list of resource consumers, a geographic definition, and a parametric definition.

6. The method of claim 1, wherein storing the collected resource usage data in an electronic storage device comprises storing the collected resource usage data in an electronic storage device that is centralized with respect to the resource consumer.

7. The method of claim 1, wherein collecting the resource usage data comprises uploading the resource usage data from at least one usage monitoring device.

8. The method of claim 1, further comprising:

aggregating, by the processor, the collected resource usage data;

and wherein:

storing the collected resource usage data in an electronic storage device comprises storing the aggregated resource usage data in an electronic storage device;

comparing, by the processor, the assessed performance of the resource consumers engaged in the competition comprises comparing, by the processor, aggregated resource usage data among resource consumers engaged in the competition.

9. The method of claim 8, wherein comparing the aggregated resource usage data comprises comparing, by the processor, the aggregated resource usage data with at least one selected from the group consisting of:

an aggregation of data for at least one other resource consumer;

resource usage data for a specified set of resource consumers; and resource usage data for a geographically defined set of resource consumers.

10. The method of claim 1, further comprising:

receiving, by the processor, at least one resource usage goal specifying a quantitative reduction in resource usage; and comparing, by the processor, the collected resource usage data against the received usage goal.

11. The method of claim 1, wherein the competitions screen is accessed by activating a competitions tab of the user interface.

12. A system for collecting, comparing, and displaying resource usage data, comprising:

an input device configured to receive, via an interactive competitions screen of a user interface, a request to initiate a competition among a plurality of resource consumers, wherein performance of each resource consumer within the competition is based on the resource consumer's reduction in resource usage over a period of time;

a network communication interface, configured to transmit a request to at least one resource consumer to engage in the competition, and further configured to receive, from at least one resource consumer, an acceptance of the transmitted request;

a processor, communicatively coupled to the input device and to the network communication interface, configured to initiate the competition; and a storage device, coupled to the processor, configured to collect and store resource usage data associated with a first resource consumer;

wherein the processor is further configured to retrieve stored resource usage data associated with at least two resource consumers engaged in the competition, assess performance of each resource consumer engaged in the competition by determining the resource consumer's reduction in resource usage over a period of time, and compare the assessed performance of the resource consumers engaged in the competition;

the system further comprising an output device, communicatively coupled to the processor, configured to display the results of the comparison, the displayed results comprising a comparative representation of resource consumer performance based on each resource consumer's reduction in resource usage.

13. The system of claim 12, further comprising:
a post-processing module, coupled to the storage device, configured to process the collected resource usage data;
and wherein the storage device is configured to store the processed resource usage data.

14. The system of claim 12, wherein each resource consumer comprises at least one selected from the group consisting of:
an individual;
a family;
a group;
a corporation;
an organization;
an institution;
at least one division within an organization;
at least one department within an organization;
a building;
a municipality;
a geographically defined set of entities;
a utility district;
a service area;
a zone;
a sub-zone;
a climatic zone;
a residence;
a floor;
a room; and
an office.

15. The system of claim 12, wherein:
the processor is configured to receive a definition of a group of resource consumers; and
the output device is configured to display comparative resource usage data associated with the resource consumers in the group.

16. The system of claim 15, wherein the definition comprises at least one of a list of resource consumers, a geographic definition, and a parametric definition.

17. The system of claim 12, wherein the storage device is centralized with respect to the resource consumer.

18. The system of claim 12, wherein the storage device is configured to receive the resource usage data from at least one usage monitoring device.

19. The system of claim 12, further comprising:
a post-processing module, coupled to the storage device, configured to aggregate the collected resource usage data;
and wherein the storage device is configured to store the aggregated resource usage data.

20. The system of claim 12, further comprising:
a post-processing module, coupled to the storage device, configured to aggregate the collected resource usage data;
and wherein the processor:
is configured to receive at least one resource usage goal specifying a quantitative reduction in resource usage; and
is configured to compare the collected resource usage data against the received usage goal.

21. The system of claim 12, wherein the competitions screen is accessed by activating a competitions tab of the user interface.

* * * * *